US012584999B2

(12) United States Patent
Fisher et al.

(10) Patent No.: US 12,584,999 B2
(45) Date of Patent: Mar. 24, 2026

(54) OPTICAL APERTURE DIVISION FOR CUSTOMIZATION OF FAR FIELD PATTERN

(71) Applicant: Sense Photonics, Inc., Durham, NC (US)

(72) Inventors: Brent Fisher, Bethesda, MD (US); Russell Kanjorski, Chapel Hill, NC (US)

(73) Assignee: Sense Photonics, Inc., Durham, NC (US)

( * ) Notice: Subject to any disclaimer, the term of this patent is extended or adjusted under 35 U.S.C. 154(b) by 1088 days.

(21) Appl. No.: 17/612,370

(22) PCT Filed: May 21, 2020

(86) PCT No.: PCT/US2020/034028
§ 371 (c)(1),
(2) Date: Nov. 18, 2021

(87) PCT Pub. No.: WO2020/237067
PCT Pub. Date: Nov. 26, 2020

(65) Prior Publication Data
US 2022/0229159 A1      Jul. 21, 2022

Related U.S. Application Data

(60) Provisional application No. 62/852,062, filed on May 23, 2019.

(51) Int. Cl.
*G01S 7/481* (2006.01)
*G01S 17/89* (2020.01)
*G01S 17/931* (2020.01)

(52) U.S. Cl.
CPC ............ *G01S 7/4815* (2013.01); *G01S 17/89* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 7,544,945 | B2 | 6/2009 | Tan et al. |
| 10,416,289 | B2 | 9/2019 | Hellmig et al. |

(Continued)

FOREIGN PATENT DOCUMENTS

| | | |
|---|---|---|
| CN | 107250841 A | 10/2017 |
| EP | 3447862 A1 | 2/2019 |

(Continued)

OTHER PUBLICATIONS

Extended European Search Report corresponding to European Application No. 20810205.3 (11 pages) (Nov. 25, 2022).

(Continued)

*Primary Examiner* — Bao-Luan Q Le
*Assistant Examiner* — Danell L Owens
(74) *Attorney, Agent, or Firm* — Kilpatrick Townsend & Stockton LLP

(57) ABSTRACT

A Light Detection and Ranging (LIDAR) apparatus includes an optical aperture, an emitter array including emitter elements arranged and configured to output optical signals through respective sub-regions of the optical aperture to illuminate respective portions of a field of view, and an optical element in at least a portion of the optical path of the optical signals. The optical element is configured to divert a first subset of the optical signals away from the respective portions of the field of view without substantially altering a second subset of the optical signals. Related optical elements and methods of fabrication are also discussed.

27 Claims, 12 Drawing Sheets

(56)                    References Cited

U.S. PATENT DOCUMENTS

| | | | |
|---|---|---|---|
| 2003/0117632 A1 | 6/2003 | Golini et al. | |
| 2007/0181810 A1 | 8/2007 | Tan et al. | |
| 2013/0128084 A1 | 5/2013 | Vinogradov et al. | |
| 2014/0049610 A1 | 2/2014 | Hudman et al. | |
| 2014/0327875 A1 | 11/2014 | Blum et al. | |
| 2018/0011490 A1* | 1/2018 | You ..................... | G05D 1/0088 |
| 2018/0038944 A1 | 2/2018 | Hellmig et al. | |
| 2018/0301872 A1 | 10/2018 | Burroughs et al. | |
| 2018/0301874 A1 | 10/2018 | Burroughs et al. | |
| 2018/0329065 A1* | 11/2018 | Pacala ..................... | G01S 17/42 |
| 2019/0011556 A1 | 1/2019 | Pacala et al. | |

FOREIGN PATENT DOCUMENTS

| | | | |
|---|---|---|---|
| JP | 2003121546 A | 4/2003 | |
| JP | 2007214564 A | 8/2007 | |
| JP | 2018004464 A | 1/2018 | |
| JP | 2018511785 A | 4/2018 | |

OTHER PUBLICATIONS

Notification of Transmittal of the International Search Report and the Written Opinion of the International Searching Authority, or the Declaration, in corresponding PCT Application No. PCT/US2020/034028 (Aug. 12, 2020).

JP2021-569495, "Office Action", Mar. 15, 2024, 10 pages.

CN202080052884.9 , "Office Action", Sep. 4, 2024, 18 pages.

CN202080052884.9, "Office Action", Mar. 13, 2025, 17 pages.

KR10-2021-7042030, "Office Action", Feb. 27, 2025, 17 pages.

EP20810205.3, "Office Action", Dec. 17, 2025, 8 pages.

* cited by examiner

VERTICAL RANGE-FOV

——— IDEAL #1    — — — IDEAL #2    - - - - - - NO DIFFUSER

VERTICAL RANGE-PATTERN

——— IDEAL #1

— — — IDEAL #2

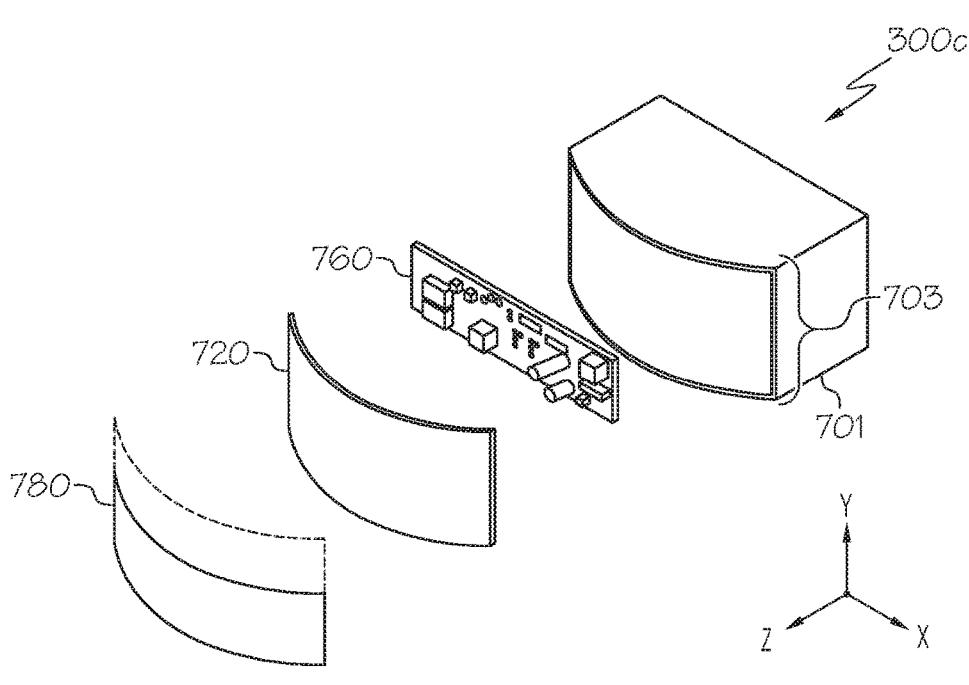
FIG. 3C
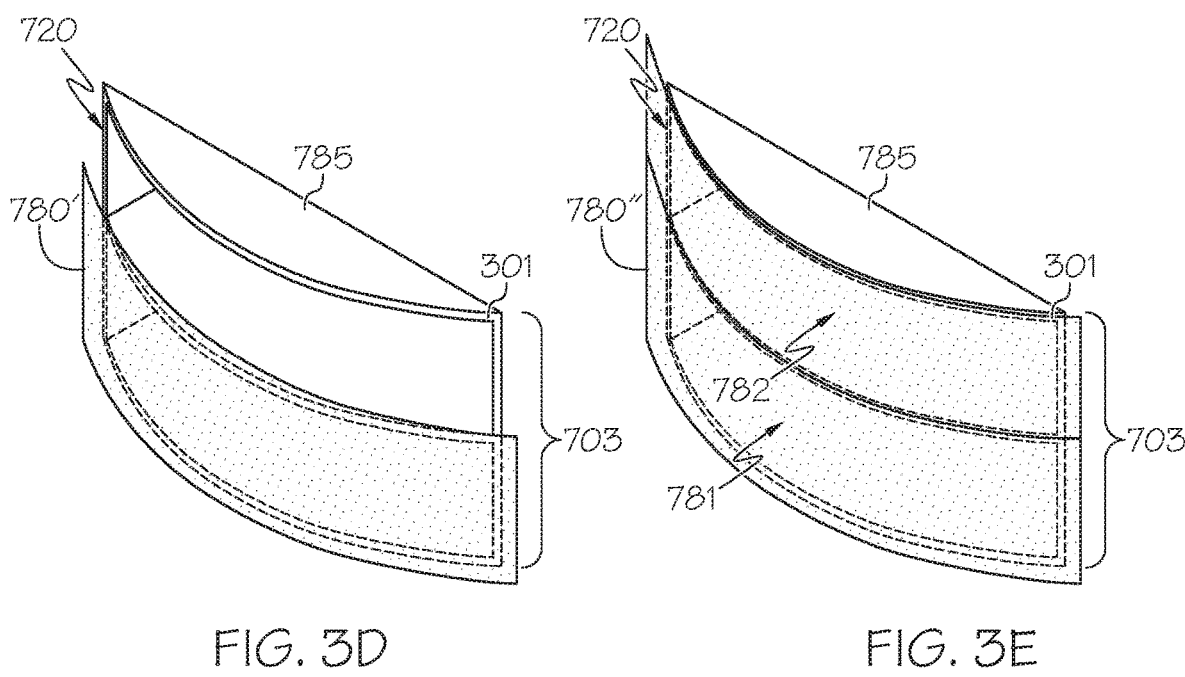
FIG. 3D
FIG. 3E

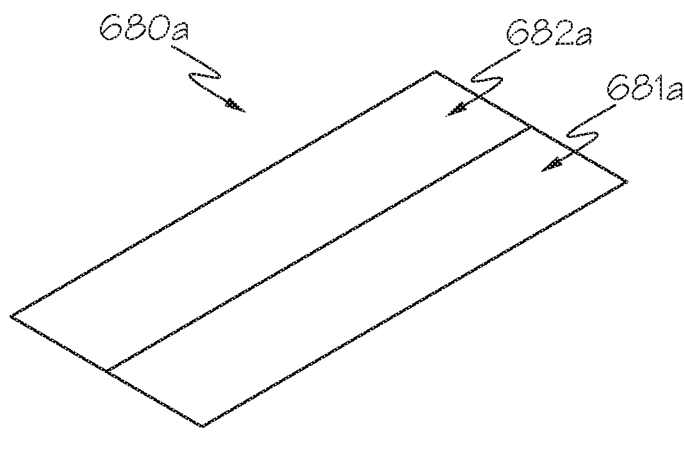
FIG. 6A
FIG. 6B
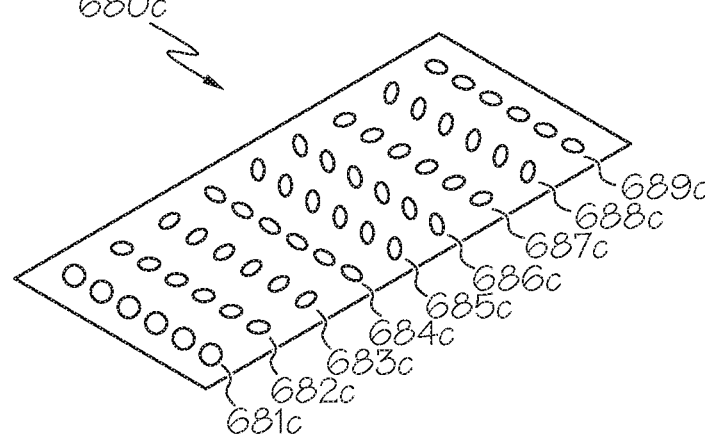
FIG. 6C

OPTICAL APERTURE DIVISION FOR CUSTOMIZATION OF FAR FIELD PATTERN

CLAIM OF PRIORITY

This application is a 35 U.S.C. 371 national stage application of PCT International Application No. PCT/US2020/034028, filed on May 21, 2020, which claims priority from U.S. Provisional Patent Application No. 62/852,062 filed May 23, 2019 with the United States Patent and Trademark Office, the disclosures of which are incorporated by reference herein in their entireties.

FIELD

The present disclosure relates to light-based three-dimensional imaging, and related devices and methods of operation.

BACKGROUND

Many emerging technologies, such as Internet-of-Things (IoT) and autonomous navigation, may involve detection and measurement of distance to objects in three-dimensional (3D) space. For example, automobiles that are capable of autonomous driving may require 3D detection and recognition for basic operation, as well as to meet safety requirements. 3D detection and recognition may also be needed for indoor navigation, for example, by industrial or household robots or toys.

Light based 3D measurements may be superior to radar (low angular accuracy, bulky) or ultra-sound (very low accuracy) in some instances. For example, a light-based 3D sensor system may include a detector (such as a photodiode or camera) and a light emitting device (such as a light emitting diode (LED) or laser diode) as light source, which typically emits light outside of the visible wavelength range over a desired field of view. A vertical cavity surface emitting laser (VCSEL) is one type of light emitting device that may be used in light-based sensors for measurement of distance and velocity in 3D space. Arrays of VCSELs may allow for power scaling and can provide very short pulses at higher power density.

SUMMARY

Embodiments described herein provide methods, systems, and devices including electronic circuits that provide a Light Detection and Ranging (LIDAR) system including one or more emission sources (including semiconductor lasers, such as surface- or edge-emitting laser diodes; generally referred to herein as emitters) having optical apertures and associated optics (collectively referred to as illumination or emitter optics) that are configured to generate a desired far field pattern of energy distribution. More particularly, embodiments described herein may provide an optical emission source (e.g., including one or more lasers or LEDs) that has relatively large optical aperture area (e.g., greater than about 1-2 mm in diameter or diagonal, for example, greater than about 5 mm, greater than about 10 mm, greater than about 20 mm, greater than about 50 mm, or greater than about 100 mm in diameter or diagonal) or is otherwise large enough for at least one optical element to selectively divert light from respective sub-regions of the optical aperture to different portions or angles of a field of view.

According to some embodiments, a LIDAR apparatus includes an optical aperture, an emitter array including emitter elements arranged and configured to output optical signals through respective sub-regions of the optical aperture to illuminate respective portions of a field of view, and an optical element in an optical path of at least a subset of the optical signals. The optical element is configured to divert a first subset of the optical signals away from at least one of the respective portions of the field of view configured to be illuminated by the first subset of the optical signals, without substantially altering a second subset of the optical signals.

According to some embodiments, a LIDAR imaging element includes an optical element that is configured to be arranged on an optical aperture of an emission source, where the optical aperture includes respective sub-regions that correspond to respective portions of a field of view. The optical element has optical characteristics that vary over the respective sub-regions of the optical aperture and is configured to divert a first subset of optical signals from the emission source away from at least one of the respective portions of the field of view without substantially altering a second subset of the optical signals.

According to some embodiments, a method of fabricating a LIDAR apparatus includes providing an emitter array including emitter elements that are configured to output optical signals through an optical aperture to illuminate respective portions of a field of view, and providing an optical element that is configured to divert a first subset of the optical signals away from at least one of the respective portions of the field of view configured to be illuminated thereby, without substantially altering a second subset of the optical signals.

In some embodiments of the LIDAR apparatus, fabrication method, and/or imaging element, first and second sub-regions of the optical aperture may define or be identified as defining optical paths of the first and second subsets of the optical signals, respectively, and at least a portion of the optical element may be arranged to be aligned with the first sub-region of the optical aperture.

In some embodiments of the LIDAR apparatus, fabrication method, and/or imaging element, the optical element may be configured to divert the first subset of the optical signals such that illumination of the respective portions of the field of view comprises a non-uniform intensity distribution.

In some embodiments of the LIDAR apparatus, fabrication method, and/or imaging element, the non-uniform intensity distribution may include a linear combination of respective far field illumination patterns corresponding to the first and second sub-regions of the optical aperture. For example, the non-uniform intensity distribution may include coherent addition of the respective far field illumination patterns.

In some embodiments of the LIDAR apparatus, fabrication method, and/or imaging element, first and second subsets of the emitter elements that are configured to emit the first and second subsets of the optical signals may be arranged in different regions of the emitter array, respectively.

In some embodiments of the LIDAR apparatus, fabrication method, and/or imaging element, first and second subsets of the emitter elements that are configured to emit the first and second subsets of the optical signals may be arranged in different rows of the emitter array, respectively, to provide a desired illumination pattern over a vertical field of view.

In some embodiments of the LIDAR apparatus, fabrication method, and/or imaging element, first and second subsets of the emitter elements that are configured to emit the first and second subsets of the optical signals may be arranged in different columns of the emitter array, respectively, to provide a desired illumination pattern over a horizontal field of view.

In some embodiments of the LIDAR apparatus, fabrication method, and/or imaging element, the optical element may be configured to collimate the first subset of optical signals without substantially affecting divergence of the second subset of the optical signals.

In some embodiments of the LIDAR apparatus, fabrication method, and/or imaging element, the second sub-region of the optical aperture may be free of the optical element.

In some embodiments of the LIDAR apparatus, fabrication method, and/or imaging element, the optical element may include first and second regions having different optical characteristics that are aligned with the first and second sub-regions of the optical aperture, respectively.

In some embodiments of the LIDAR apparatus, fabrication method, and/or imaging element, the second region of the optical element may be free of optical power.

In some embodiments of the LIDAR apparatus, fabrication method, and/or imaging element, the different optical characteristics may vary in a stepwise or continuous fashion between the first and second regions of the optical element.

In some embodiments of the LIDAR apparatus, fabrication method, and/or imaging element, the optical element may be or may include a patterned diffuser with first and second regions having different optical characteristics that are aligned with the first and second sub-regions of the optical aperture, respectively.

In some embodiments of the LIDAR apparatus, fabrication method, and/or imaging element, the optical element may be or may include a lens array with first and second lens elements having different optical characteristics that are aligned with the first and second sub-regions of the optical aperture, respectively.

In some embodiments of the LIDAR apparatus, fabrication method, and/or imaging element, the optical element is aligned with at least one sub-region of the optical aperture such that a subset of the respective optical signals passes therethrough. The optical element may be arranged or otherwise configured to selectively divert the respective optical signals from respective sub-regions of the optical aperture to respective sub-regions of the field of view.

In some embodiments of the LIDAR apparatus, fabrication method, and/or imaging element, the respective sub-regions of the emitter array are configured to provide respective far field patterns over respective sub-regions or field angles of the field of view, to collectively define a desired far field pattern of energy over the desired field of view or beyond. For example, a linear combination of the respective far field patterns (e.g., one pattern from each sub-region of the optical aperture) may provide an overall, non-uniform distribution of photon flux over the field of view corresponding to a desired far field pattern.

In some embodiments of the LIDAR apparatus, fabrication method, and/or imaging element, the optical element may only partially cover or may be only partially aligned to the optical aperture, i.e., the optical element may be positioned in an optical path of only a portion or sub-region of the optical aperture, such that one or more other sub-regions of the optical aperture are free of the optical elements thereon.

In some embodiments of the LIDAR apparatus, fabrication method, and/or imaging element, the optical element may include different optical elements (e.g. different diffusers, diffractive optics, lenses, etc.) aligned with or otherwise in the optical path of different sub-regions of the optical aperture.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

BRIEF DESCRIPTION OF THE DRAWINGS

FIG. 3C is an exploded view illustrating components of LIDAR devices including optical elements configured to provide illumination having a non-uniform intensity distribution over a vertical field of view in accordance with some embodiments of the present disclosure.

FIG. 3D is an enlarged perspective view illustrating an example of the optical element and emitter array and of FIG. 3C.

FIG. 3E is an enlarged perspective view illustrating a further example of the optical element and emitter array and of FIG. 3C.

FIG. 6A is a perspective view illustrating an example of an optical element configured to provide illumination having a non-uniform intensity distribution by dividing a large emission optical aperture into multiple sub-regions in accordance with some embodiments of the present disclosure.

FIG. 6B is a plan view illustrating an example of an optical element configured to provide illumination having a non-uniform intensity distribution by dividing a large emission optical aperture into multiple sub-regions in accordance with further embodiments of the present disclosure.

FIG. 6C is a perspective view illustrating an example of an optical element configured to provide illumination having a non-uniform intensity distribution by providing different microlens shapes for respective sub-regions of a large emission optical aperture in accordance with some embodiments of the present disclosure.

DETAILED DESCRIPTION

In the following detailed description, numerous specific details are set forth to provide a thorough understanding of embodiments of the present disclosure. However, it will be understood by those skilled in the art that the present disclosure may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the present disclosure are described herein with reference to lidar applications and systems. A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A flash lidar system may acquire images by emitting light from an array, or a subset of the array, of emitter elements for short durations (pulses) over a field of view or scene. A non-flash or scanning lidar system may generate image frames by raster scanning light emission (continuously) over a field of view or scene, for example, using a point scan or line scan to emit the necessary illumination power per point and sequentially scan to reconstruct the full field of view.

Figure 1A:
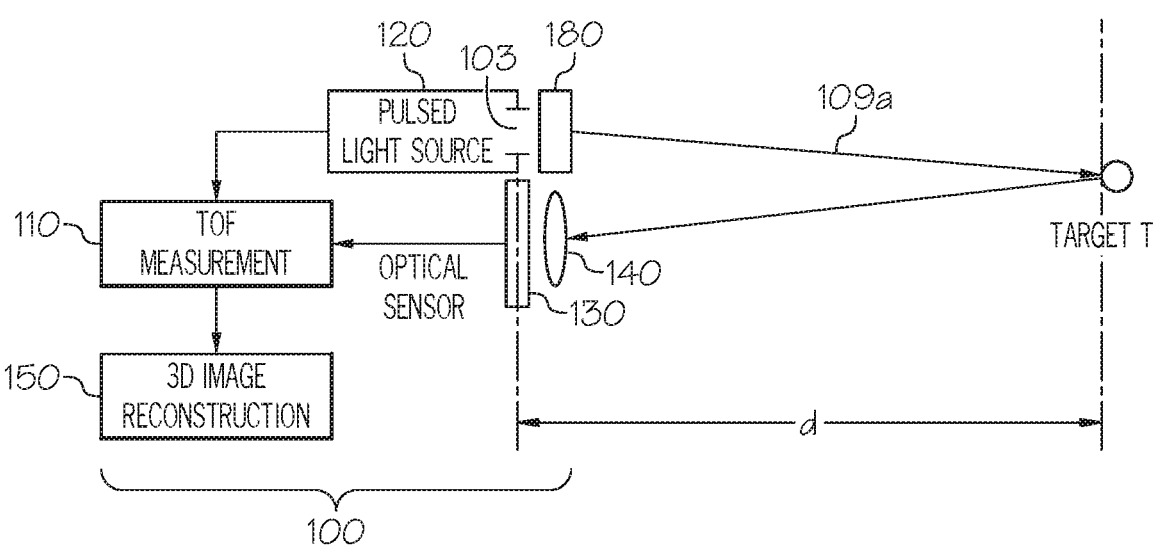
FIG. 1A is a block diagram illustrating an example of a light-based 3D sensor system in accordance with some embodiments of the present disclosure.

FIG. 1A illustrates an example light-based 3D sensor system 100, such as a Light Detection and Ranging (LIDAR) system, may use time-of-flight (TOF)-based measurement circuit 110 and a 3D image reconstruction circuit 150 based on a signal received from an optical detector circuit 130 and associated collection or detector optics 140, with a light emission source 120 (described by way of example herein with reference to an emitter array including one or more emitter elements) that illuminates a field of view. In some embodiments, each of the emitter elements in the emitter array is connected to and controlled by a driver circuit. In other embodiments, respective groups of emitter elements in the emitter array (e.g., emitter elements in spatial proximity to each other), may be connected to a common driver circuit. The driver circuit or circuitry may include one or more driver transistors, which are configured to control the timing and amplitude of the optical emission signal.

One or more of the emitter elements of the emitter array 120 may define emitter units that respectively emit optical illumination pulses or continuous wave signals (generally referred to herein as optical signals, emitter signals, or light emission 190) at a time and frequency controlled by a timing generator or driver circuit. In particular embodiments, the emitters may be pulsed light sources, such as LEDs or lasers (such as vertical cavity surface emitting lasers (VCSELs)). The emitters of the emitter array 120 may output the optical signals through a common optical aperture 103. A single or common optical aperture as described herein refers to an aperture that continuously extends with translational symmetry in the optical paths of respective optical signals output from multiple emitters of an emitter array.

At least one optical element 180 (e.g., a diffuser, a lens, a lens array, etc.) is provided in the optical path of the emitter array 120 to divert at least a subset of the optical signals 190 to increase the field of view and/or provide a desired illumination pattern. The optical element(s) 180 (also referred to herein as illumination optics) may include optical characteristics that vary over the optical aperture 104 to increase and/or tailor light output over a field of view of the emitter array 120. The optical element(s) 180 can be configured to provide a sufficiently low beam divergence of the light output from the emitter array 120 so as to ensure that fields of illumination of either individual or groups of emitter elements do not significantly overlap, and yet provide a sufficiently large beam divergence of the light output from the emitter elements to provide eye safety to observers.

As described herein, the field of view (FOV) may refer to an angular range (e.g., 180 degrees) that defines a region that can be imaged by the system 100. The FOV may be illuminated by the optical signals 190 output from emission source 120 through the aperture 103. The FOV may be divided into angular sub-regions or sub-ranges. Any given point or area within the FOV may also referred to as a "field angle." Embodiments are described herein with reference to two dimensions of the field of view, a 'vertical' field of view (indicating a field of view in a vertical or height direction, that is, above or below an optical axis of the emission source 120), and/or a 'horizontal' field of view (indicating a field of view in a horizontal direction, that is, to the left or right of the optical axis of the emission source 120), which can be varied alone or in combination to provide a desired three-dimensional far field illumination pattern.

Light emission 109a from one or more of the emitters of the emitter array 120 is output through the aperture 103, and is directed by the optical element(s) 180 to impinge on and be reflected by one or more targets T. The reflected light (also referred to herein as a return signal or echo signal) is detected as an optical signal by one or more of the detectors 130 (e.g., via one or more lenses 140), converted into an electrical signal representation, and processed (e.g., based on time of flight) to define a 3-D point cloud representation of the field of view.

The time-of-flight measurement circuit 110 may implement a pixel processor that measures and/or calculates the time of flight of the illumination pulse over the journey from the light source 120 to target T and back to the optical sensors or detectors 130, using direct or indirect ToF measurement techniques. For example, the time-of-flight measurement circuit 110 may determine the distance d to target T in the field of view by measuring the round trip ("time-of-flight"; ToF) of a light pulse 109a reflected by the target T (where d=(speed of light (c)/2)×ToF), which may be used by the 3D image reconstruction circuit 150 to create an accurate 3D map of surroundings. More generally, operations of LIDAR systems in accordance with embodiments of the present disclosure may be performed by one or more processors or controllers, which may be implemented as one or more control circuits that may be included in or communicate with the driver circuit, emitter array, detector timing circuit, and/or detector array.

Some advantages of LIDAR systems may include long range; high accuracy; superior object detection and recognition; higher resolution; higher sampling density of 3D point cloud; and effectivity in diverse lighting and/or weather conditions. For example, the system 100 may be a flash LIDAR system that is configured to illuminate a region of interest in a field of view (e.g., a subset of angles over the field of view) with sufficient light to generate a return signal at certain distances. The distance or range that a lidar system 100 may need to be able to 'see' (i.e., to detect targets T) may be different for different points within the field of view, such that a desired amount of illumination power for a far field pattern defined by the optical signals 109a at various points (or angles) of the field of view may vary over the field of view. As used herein, illumination power may refer to the power or intensity of the light provided by the emitted optical signals. The far field pattern may refer to the distribution of the illumination power of the emitted optical signals 109a as a function of angle at distances that are significantly larger than the length scale of the aperture 103 and/or focal length of optics 180 of the emission source 120. More generally, the far field pattern may refer to a beam divergence of light output beyond the focal point of the illumination optics 180 associated with the emission source 120.

In some applications, the desired illumination power may vary at respective portions/angles/sub-regions of a field of view, that is, to provide a non-uniform intensity distribution over the respective portions of the field of view. For example, some emission sources may provide a substantially conical (or "pie-shaped" when defined over horizontal or vertical fields of view) illumination pattern. However, in many applications (e.g., vehicle navigation), such a conical or pie-shaped intensity distribution may be undesirable, as light emission with sufficient illumination power to illuminate farther distance ranges may in some instances be distributed to closer distance ranges (e.g., directly into the ground adjacent the vehicle), thereby wasting energy. A non-uniform intensity distribution may thus be desirable from power efficiency and/or imaging perspectives. For example, a non-uniform intensity distribution over the vertical field of view may be desirable to direct illumination up or down sloping roadways, while a non-uniform intensity distribution over the horizontal field of view may be desirable to direct illumination at edges of a roadway rather than beyond.

Figure 1B:
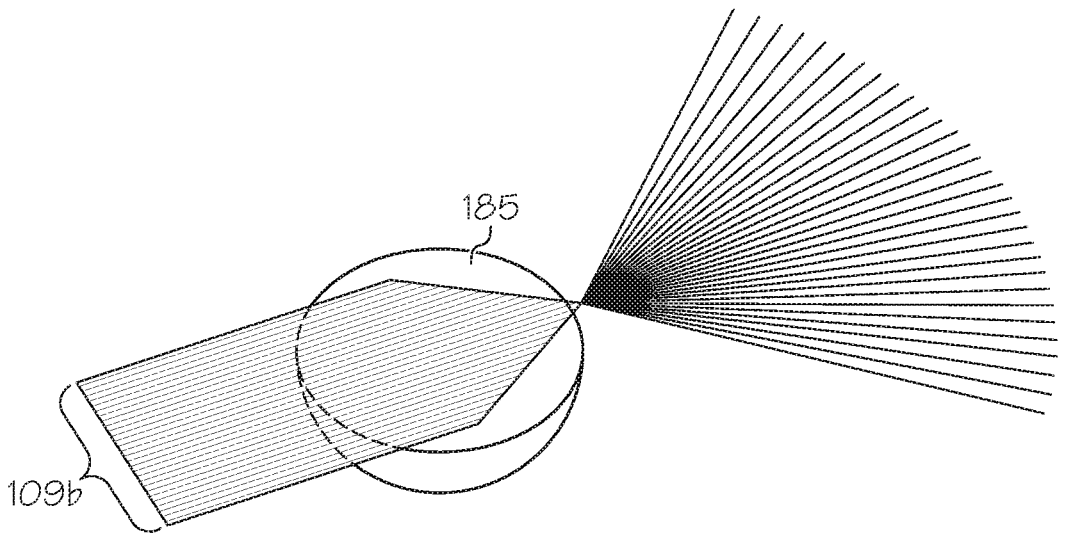
FIG. 1B illustrates example of expanding a beam with a lens.

Illuminating a field of view for LIDAR or other light-based 3D measurements may be implemented in various ways. For example, the illumination optics may be implemented as light shaping diffuser that includes microstructured refractive or diffractive surfaces to transmit respective amounts of light from an emission source in a variety of directions to provide a desired far field pattern. FIG. 1B illustrates an example lens system 185 that may be used to diverge or expand optical signals 109b from a single point or extended light source into respective directions or angles over the field of view. Such a lens system may include a single lens or a combination of lenses to focus and diverge an incoming collimated beam.

Figure 2A:
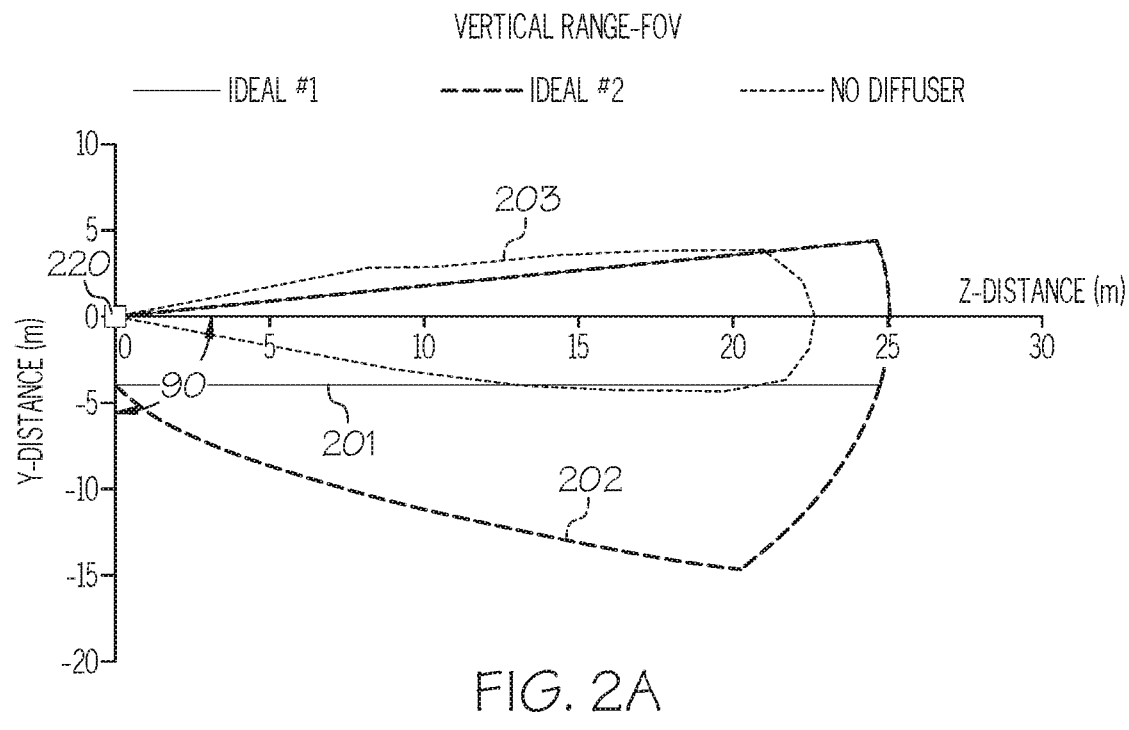
FIGS. 2A, 2B, and 2C are graphs illustrating examples of target far field illumination patterns over a vertical field of view that can be provided by optical elements in accordance with some embodiments of the present disclosure.
Figure 2B:
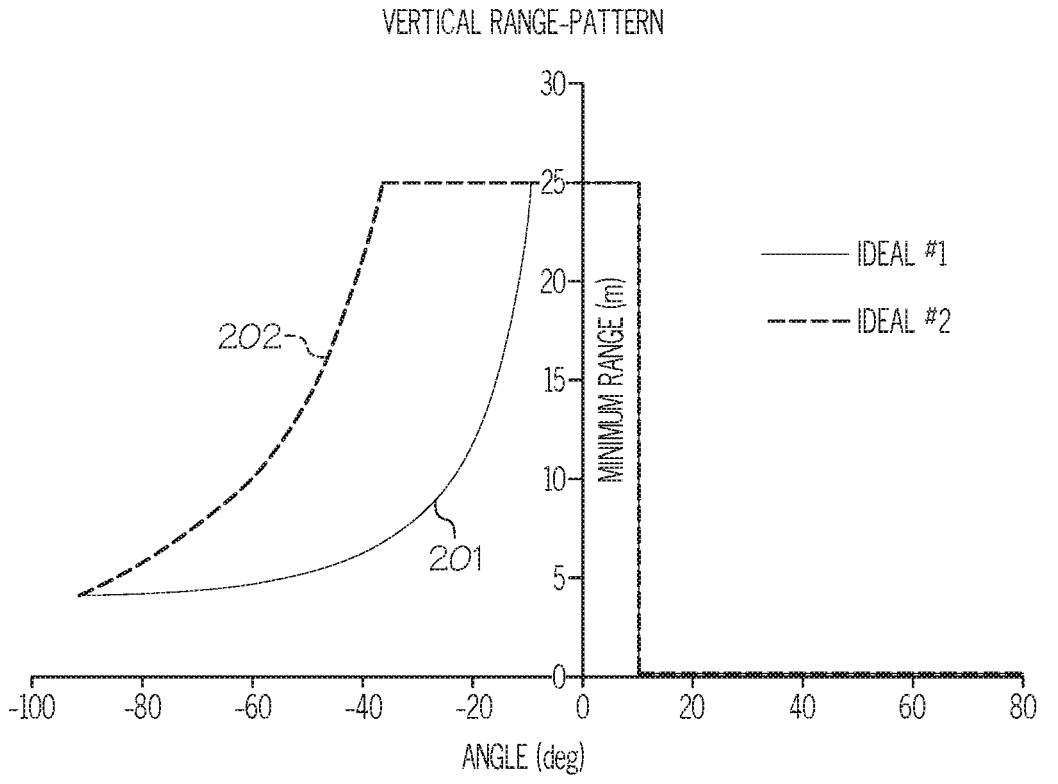

However, some desired far field patterns may be difficult to achieve using a single diffuser or other single optical element. FIG. 2A illustrates example desired far field patterns 201 and 202 over a vertical FOV in comparison with the substantially conical far field pattern 203 provided by an emission source having no diffuser elements in its optical path in the vertical (y-) direction. As used herein, the vertical (y-) direction may indicate height or elevation, for example, relative to an optical axis of the emission source 220 defined in a horizontal (z-) direction. In some embodiments, the z-direction may correspond to an intended direction of travel of a vehicle. In other embodiments, the z-direction may be oriented away from the intended direction of travel of a vehicle, for example, for imaging of driver blind spots along one or more sides of the vehicle. FIG. 2B illustrates angular range coverage of the desired far field patterns 201 and 202 in the vertical (y-) direction, relative to the optical axis of the emission source 220. In FIGS. 2A and 2B, the distance range of 25 meters (m) along the z-direction (and 4 m along the y-direction) is provided by way of example only to illustrate possible intensity distributions in the two directions, and greater or smaller ranges in these or other directions may be used.

As shown in FIGS. 2A and 2B, the first far field pattern 201 provides a power efficient far field illumination pattern that provides illumination (of variable intensity) across a vertical field of view of at least 60° (for example, up to about 90° or more), which may provide sufficient illumination power to image a substantially flat surface, while reserving illumination power for imaging longer ranges along the z-direction. The second far field pattern 202 provides significant illumination power distribution over greater angles for imaging steep or low angles (e.g., 45° to 90°) below the optical axis of the emission source 220, for example, when used in vehicle navigation for imaging a grade or slope of a roadway over which a vehicle is traveling, which are not provided by the "no diffuser" pattern 203.

Figure 2C:
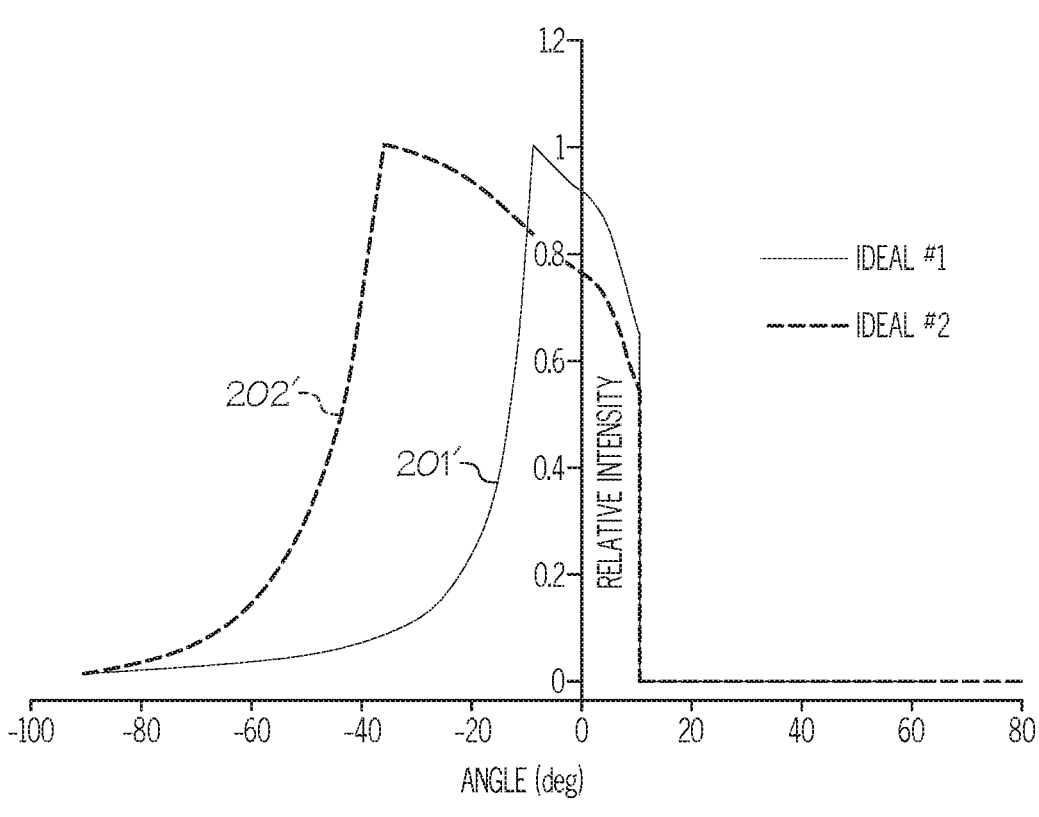

The far field patterns 201 and 202 shown in FIGS. 2A and 2B may represent ideal or desired patterns after integration of the optical elements in the optical path of the emission source 220. As such, the illumination power required to provide the relative range desired at each angle shown in FIG. 2B may not be proportional to the amount of relative amount of illumination power that should be directed in each direction, as propagation losses and differences in lens collection efficiency (caused by distortion) in each field direction should be accounted for. FIG. 2C illustrates conversion of the vertical range pattern of FIG. 2B into desired emission patterns 201' and 202' to be provided by the emission source 220 in order to achieve the far field patterns 201 and 202 when optical losses are taken into consideration, that is, accounting for both the desired range and lens distortion.

Multiple optical apertures and optical elements may be used to provide such desired far field patterns. For example, multiple instances of an optical system 185 as shown in FIG. 1B could be arranged (e.g., in an array) to provide a desired far field pattern, with each lens 185 covering or otherwise corresponding to a respective one of the multiple optical apertures and arranged or otherwise configured to provide the desired far field pattern. However, some existing micro-optic structures and diffusers may not offer sufficient design flexibility to provide desired far field patterns. Moreover, the optical losses introduced by providing optical elements in the optical path of an emission source may be undesirable, for example, from both imaging and power consumption perspectives.

Embodiments described herein may arise from recognition that desired far field patterns for illumination of a field of view for light-based 3D imaging may require only a portion of an emitter array to deliver coverage in a portion of the far field, and that the collective far field pattern of light output from an optical aperture of an emission source can be represented by a linear combination of the far field pattern from sub-regions of the optical aperture. Some embodiments described herein may selectively divert some (without substantially diverting or otherwise altering others) of the optical signals output from respective emitters of an emitter array using a combination of (or absence of) different lens elements over respective sub-regions of the overall optical aperture of the emitter array. As such, embodiments described herein may provide far field patterns that may not be achieved by some conventional optical arrangements, and/or with higher efficiency than some conventional optical arrangements (e.g., by providing portions or sub-regions of the optical aperture of the emitter array that are free of optics and losses associated therewith).

In particular, some embodiments described herein may 'divide' an optical aperture (through which optical signals from multiple emitters are output) into multiple (e.g., N) sub-regions, with subsets of the optical signals that are output from each of the N sub-regions defining separate or respective far field patterns. In some embodiments, the respective far field patterns can be achieved by applying one or more optical elements having different optical characteristics (e.g., different diffusers, diffractive optics, lenses, etc.) onto or otherwise in the optical path of the respective sub-regions of the optical aperture, resulting in a linear combination of far field patterns (one pattern from each sub-region of the aperture) that yields an overall, non-uniform distribution of photon flux over the field of view, providing a desired far field pattern that may otherwise be unachievable by a single diffuser or optical element.

Embodiments described herein may thus provide further design flexibility for achieving desired far field patterns by dividing the optical emission aperture into respective sub-regions, and arranging one or more optical elements that are configured to divert subsets of the optical signals output through the respective sub-regions of the aperture to provide respective far field patterns for corresponding portions (or angles) of the field of view, allowing improved matching of far field patterns to the desired far field patterns. Some embodiments described herein may achieve such far field patterns at a lower cost than some conventional optical structures, as a smaller number of diffusers or other optical elements can be combined in different ways to yield a larger solution space or overall intensity distribution over the field of view.

It will be understood that embodiments described herein may be particularly advantageous for emission sources having optical apertures with larger dimensions or areas for subdivision. For example, some laser illumination systems may use laser sources with relatively small optical apertures (e.g., less than a few (1-2) mm), which may not lend themselves to being easily divided unless optical signals output from each optical aperture is expanded. For larger area arrays of laser emitters described herein, such as microtransfer printed VCSEL arrays, embodiments of the present disclosure may be of particular benefit, as the relatively large optical aperture area (for example, greater than about 5 mm, greater than about 10 mm, greater than about 20 mm, greater than about 50 mm, or greater than about 100 mm in diameter or diagonal, e.g., 100 mm×25 mm) can be divided into sub-regions, and optical element(s) with regions having different optical characteristics may be arranged on, aligned with, or otherwise provided in the optical paths defined by the respective sub-regions of the overall optical aperture, or only to some sub-region of the overall optical aperture, such that other sub-regions of the overall optical aperture are free of optical elements thereon.

Figure 3A:
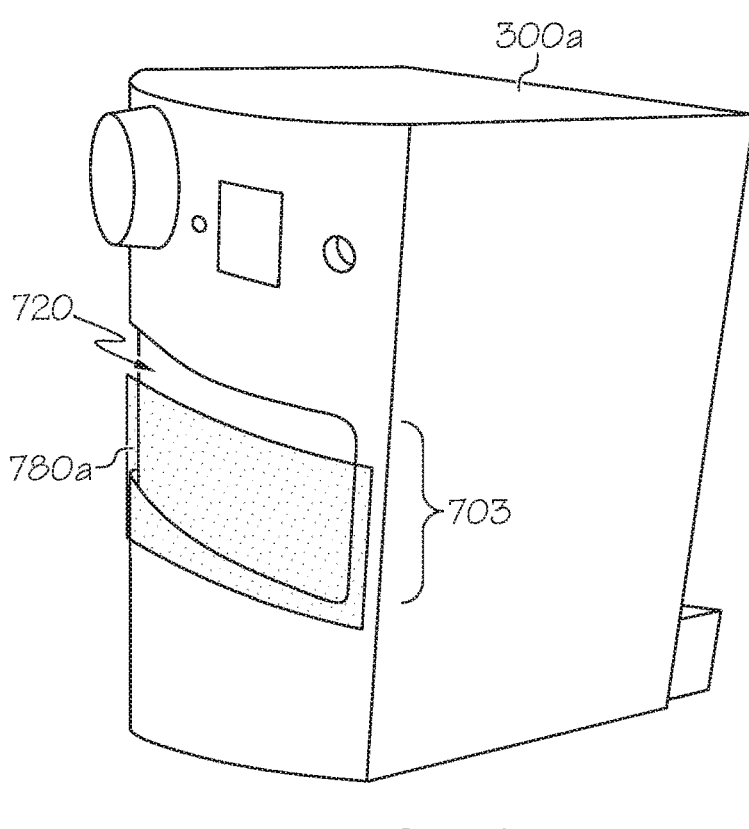
FIGS. 3A and 3B illustrate example implementations of LIDAR devices including optical elements configured to provide illumination having a non-uniform intensity distribution over a vertical field of view in accordance with some embodiments of the present disclosure.
Figure 3B:
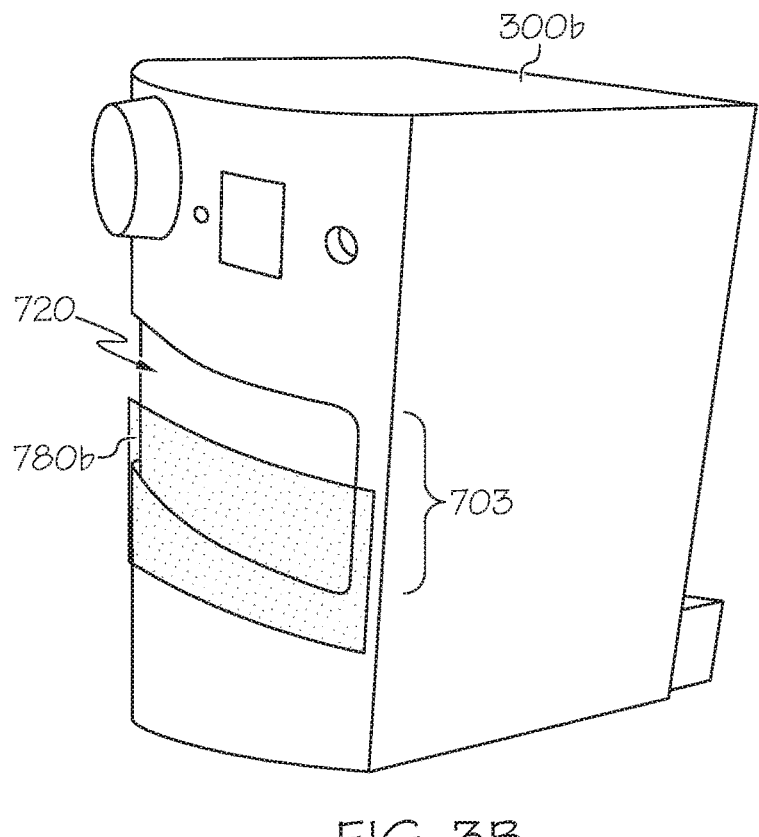

Examples of optical aperture division in accordance with some embodiments of the present disclosure are shown in FIGS. 3A and 3B. In particular, FIGS. 3A and 3B illustrate example implementations of flash LIDAR devices 300a, 300b including optical elements 780a, 780b configured to provide illumination having a non-uniform intensity distribution over a vertical field of view. As shown in FIGS. 3A and 3B, an emitter array 720 including multiple emitter elements is arranged to output optical signals through an optical aperture 703. The optical aperture 703 may distribute or otherwise output the optical signals over a horizontal field of view and over a vertical field of view, with horizontal and vertical illumination patterns dictated by the respective far field patterns of the emitter elements of the emitter array 720 and/or the curvature of the underlying substrate on which the emitters are arranged. For example, the emitter elements may be VCSELs, which may output optical signals with a divergence of about 20° to 30° (horizontally and/or vertically) through respective portions of the optical aperture 703 to illuminate corresponding portions of a field of view. The far field illumination patterns of the (e.g., many thousands of) constituent VCSELS may collectively define a substantially conical diverging pattern over the horizontal and vertical field of view.

Optical elements described herein are configured to non-uniformly increase the vertical spread of the light to provide illumination at a desired range for each vertical and/or horizontal angle, which may not be proportional to the relative amounts of illumination power directed to each direction or portion of the field of view. In some embodiments, far field illumination patterns of about 30° or more (e.g., about 60° or about 90°) over a desired range over the vertical field of view, and/or with an angle of about 90° or more (e.g., about 100° or more) over a desired range over the horizontal field of view may be achieved. More generally, optical elements in accordance with embodiments of the present disclosure are configured to selectively divert some of the optical signals output from respective portions of the optical aperture away from the respective portions or angles of the field of view that would otherwise be illuminated thereby (e.g., without substantially altering others of the optical signals output from other portions of the optical aperture), to provide illumination power intensity distribution patterns having a desired maximum range as a function of angle (e.g., a desired 'range pattern'), which may in some embodiments be non-uniform over the respective portions or angles of the field of view.

In particular, in some embodiments as shown in FIGS. 3A and 3B, the optical elements 780a, 780b are arranged to partially (rather than completely) cover respective sub-regions of the optical aperture 703, so as to selectively divert a subset of the optical signals output from lower sub-regions of the aperture 703 away from the portions of the field of view that the corresponding emitters of the emitter array 720 are arranged to illuminate, without substantially altering optical signals output from upper sub-regions of the aperture 703. That is, the illustrated partial coverage of the optical aperture 703 by optical elements 780a, 780b (illustrated as an optical diffuser by way of example) can divert light emission having optical paths defined by lower portions of the optical aperture 703 into different far field patterns than the light emission having optical paths defined by upper portions of the optical aperture 703.

In the example devices 300, 300b, the diffuser optics 780a, 708b conform to the curvature of the emitter array 720. In FIGS. 3A and 3B, the diffuser optics 780a, 780b are positioned around an exterior of the aperture 703 (e.g., such that the optical elements 780a, 780b and the emitter array 720 are on opposite sides of the aperture 703) by way of example to highlight the differences in coverage of the aperture 703 by the optical elements 780a, 780b. However, it will be understood that embodiments of the present disclosure are not limited to these examples, and may include other arrangements of the optical elements 780a, 780b and the aperture 703 relative to the emitter array 720, for example, with the optical elements 780a, 780b positioned between the emitter array 720 and the aperture. In some embodiments, one or more gaps may be provided between the emitter array 720, the optical elements 780a, 780b, and/or the optical aperture 703. In other embodiments, the emitter array 720, the optical elements 780a, 780b, and/or the optical aperture 703 may be laminated to one another to define one or more monolithic structures. Additionally or alternatively, the optical elements 780a, 780b and the optical aperture 703 may be combined or integrated into a single unit or layer that defines both the aperture and provides the desired optical characteristics over different sub-regions of the aperture.

FIG. 3C is a partial exploded view illustrating components of the LIDAR device of FIGS. 3A and 3B. As shown in FIG. 3C, the device housing or enclosure 701 is sized to house a light emitter array 720 and electronic circuitry 760 (e.g., driver and/or other control circuits to control operation of the emitter array 720). The enclosure 701 also defines an optical aperture 703 through which the light emission/optical signals from the emitter array 720 are output. One or more optical elements 780 (shown as a diffuser by way of example) can be positioned (e.g., to at least partially cover the optical aperture 703) or can be otherwise configured (e.g., with different optical structures in different regions of the optical element 780) with respect to the light emission path defined by the optical aperture 703 so as to divert different subsets of the optical signals emitted from the emitters of the array 720 into a different far field patterns over the field of view. In particular, the emitters of the emitter array 720 may be arranged such that different rows of emitters illuminate respective portions of the vertical field of view, while different columns of emitters illuminate respective portions of the horizontal field of view. While the emitter array 720 is illustrated as having a curvature along the horizontal direction to increase the horizontal field of view, it will be understood that the emitter array 720 may similarly include a curvature along the vertical direction to increase the vertical field of view, or may be substantially planar or without curvature in both the horizontal and vertical directions.

FIGS. 3D and 3E are an enlarged perspective views illustrating the emitter array 720 and examples 780' and 780" of the optical element 780 of FIG. 3C in greater detail. In some embodiments, the emitter array 720 may be a distributed emitter array including a plurality of emitters (e.g., 520e shown in FIGS. 5A-5B) positioned or arranged in rows and columns on a curved, non-native substrate 301. The non-native substrate 301 is formed of a flexible material that can be bent (e.g., around a mandrel element 785) to provide curved emitting surface, such that emitters arranged at a central portion of the substrate 301 emit optical signals to illuminate central portions of the FOV, while emitters arranged at peripheral portions of the substrate 301 emit optical signals to illuminate peripheral portions of the FOV. In some embodiment, the emitters may be VCSELs that respectively provide narrow-field illumination (e.g., each covering less than about 1 degree of the horizontal and/or vertical FOV), and the array 720 may include hundreds or thousands of VCSELs. For example, an array 720 of 1500 VCSELs, each covering a field of view of about 0.1 degree, can illuminate a 150 degree field of view.

In the example of FIG. 3D, a portion of the optical element 780' is aligned with a first (lower) sub-region of the optical aperture 703, so as to cover or otherwise be positioned in the optical paths of the optical signals emitted by one or more emitters arranged in lower rows of the emitter array 720. A second (upper) sub-region of the optical aperture 703 not covered by the optical element 780, such that the optical paths of the optical signals emitted by one or more emitters arranged in upper rows of the emitter array 720 are free of the optical element 780'. The optical element 780' may thereby divert the optical signals output from the emitters in one or more lower rows of the emitter array 720 away from the respective portions of the field of view, without substantially altering characteristics (such as propagation direction and/or beam divergence) of the optical signals output from the emitters in one or more upper rows of the emitter array 720 to thereby provide non-uniform intensity distribution over the vertical field of view.

In the example of FIG. 3E, the optical element 780" includes first and second regions 781 and 782 having different optical characteristics and/or features. For example, the first region 781 may have different refractive or diffractive properties than the second region 782. In some embodiments, the second region 782 of the optical element 780" may be transparent or otherwise free of optical power with respect to the optical signals output from the emitter array 720. As used herein, optical power may refer to the amount or degree to which an optical element alters propagation (including direction and focus) of optical signals, including refraction, diffraction, convergence, and divergence. For example, the optical element 780" may be a patterned diffuser including the first and second regions 781 and 782 having different optical characteristics. As another example, the optical element 780" may be a lens array including lens elements having different optical characteristics in the first and second regions 781 and 782.

Still referring to FIG. 3E, the first region 781 of the optical element 780" is aligned with a first (lower) sub-region of the optical aperture 703 so as to cover or otherwise be positioned in the optical paths of the optical signals emitted by one or more emitters arranged in lower rows of the emitter array 720. The second region 782 is aligned with a second (upper) sub-region of the optical aperture 703, so as to cover or otherwise be positioned in the optical paths of the optical signals emitted by one or more emitters arranged in upper rows of the emitter array 720. The first region 781 of the optical element 780" may thereby selectively divert the optical signals output from the emitters in one or more lower rows of the emitter array 720 away from the respective portions of the field of view that they are arranged to illuminate. The second region 782 of the optical element 780" may not substantially alter or affect the optical signals output from the emitters in one or more upper rows of the emitter array 720. As such to thereby provide the non-uniform intensity distribution over the vertical field of view.

Figure 4A:
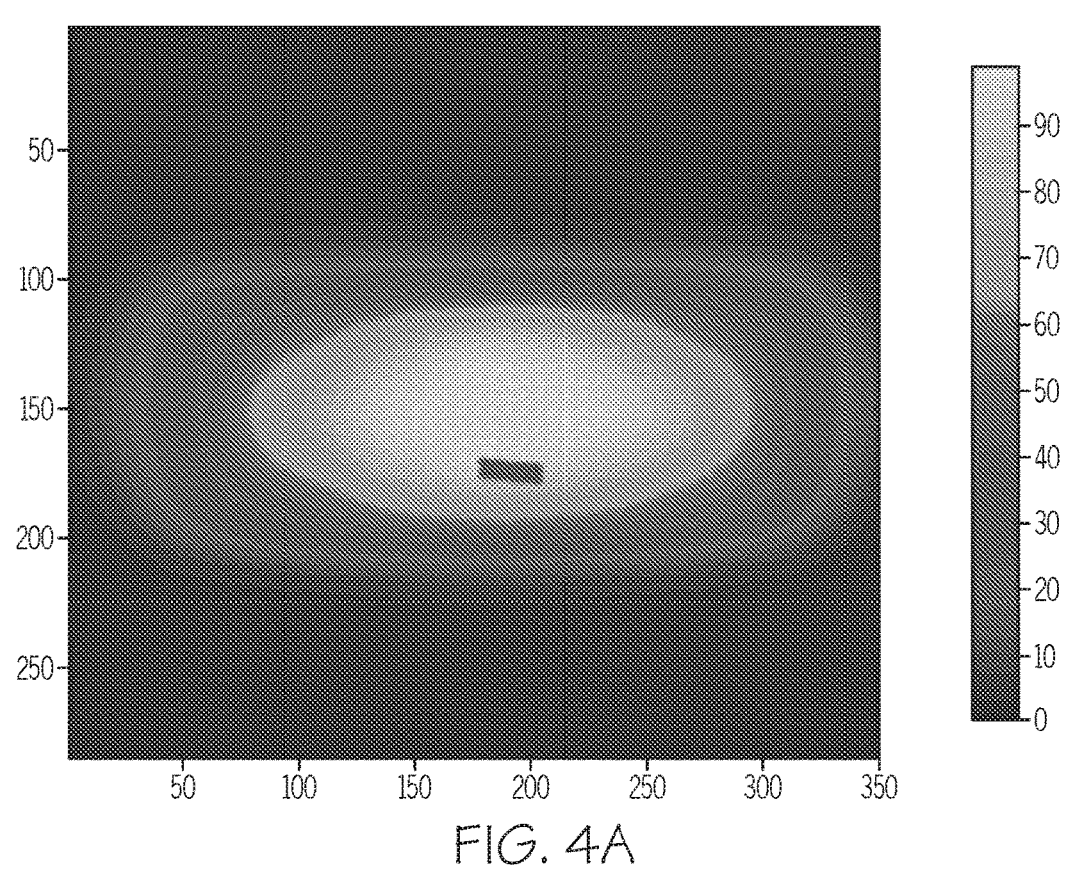
FIG. 4A is a graph illustrating a comparative example of projection of light in the absence of optical elements as described herein.
Figure 4B:
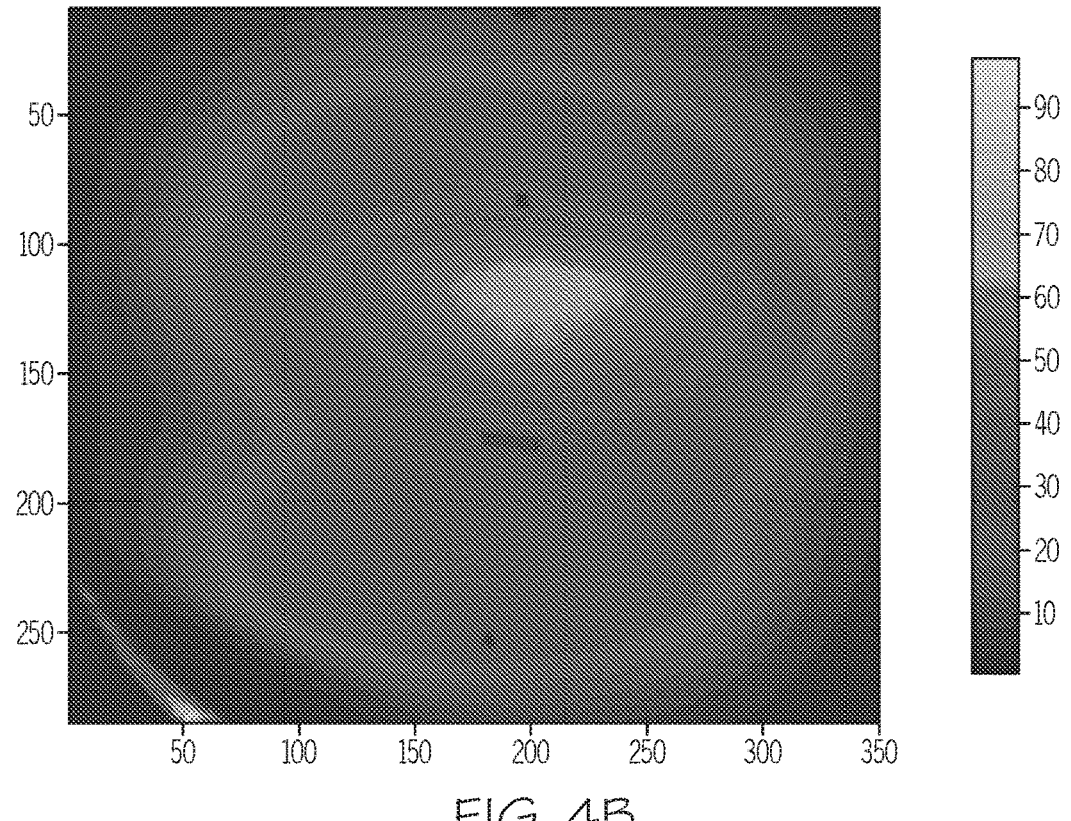
FIG. 4B is a graph illustrating projection of light using optical elements configured to provide illumination having a non-uniform intensity distribution over a vertical field of view in accordance with some embodiments of the present disclosure.

Effects on far field light pattern provided by optical elements according to some embodiments of the present disclosure (such as the optical elements 780 shown in FIGS. 3A-3E) are illustrated in FIGS. 4A and 4B. In particular, FIG. 4A illustrates a pattern of light intensity projected by an emission source (such as the emitter array 720 and aperture 703) in the absence of optical elements described herein, while FIG. 4B illustrates a pattern of light intensity projected by an emission source in which a sub-region of the optical aperture 703 is covered by a an optical element 780 (such as a diffuser) in accordance with some embodiments described herein. As shown in FIG. 4A, the emitter array 720 outputs optical signals through the aperture 703 to illuminate the field of view with a far field illumination pattern having a substantially uniform intensity distribution. In contrast, as shown in FIG. 4B, providing one or more optical elements 780 in accordance with embodiments of the present disclosure in at least a portion of the optical path of the optical signals output from the emitter array 720 through the aperture 703 preserves the general shape a portion of the far field illumination pattern of FIG. 4A at the upper portion of the field of view, but diverts some of the optical signals to provide additional light at the lower portion of the field of view to define a far field illumination pattern having a non-uniform intensity distribution.

While described above with reference to a diffuser as the optical element 780 by way of example, it will be understood that embodiments of the present disclosure are not so limited, and may include any optical element that is configured to provide different optical characteristics over an optical aperture of an emission source. For example, further embodiments of the present disclosure may use individual lenslets or sections of a lens (such as one or more sections of a Fresnel lens) to divert optical signals from or corresponding to specific sub-regions of the optical aperture area (which are aligned with respective sections of the lens) into specific field points or sub-regions of the field of view, without substantially altering optical signals from or corresponding to other sub-regions of the optical aperture area.

Figure 5A:
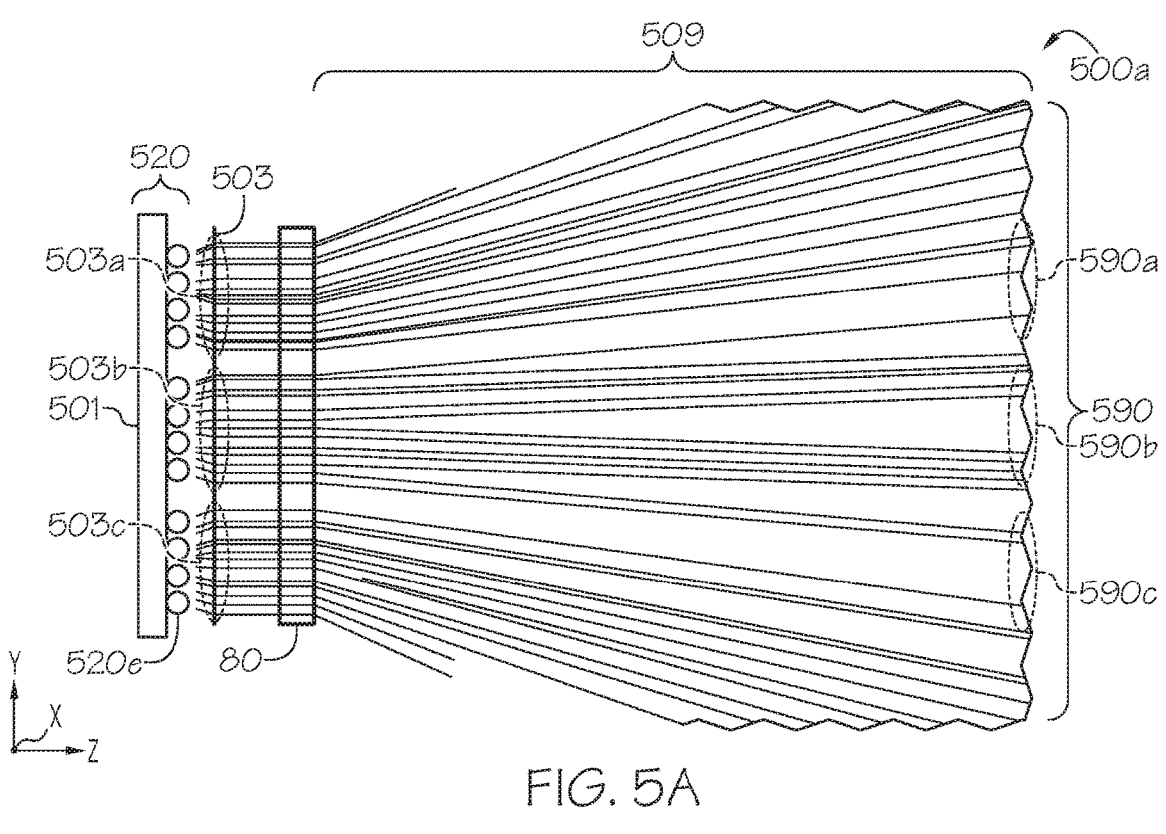
FIG. 5A illustrates a comparative example of an optical element and an emitter array configured to provide a uniform far field pattern over a vertical field of view.
Figure 5B:
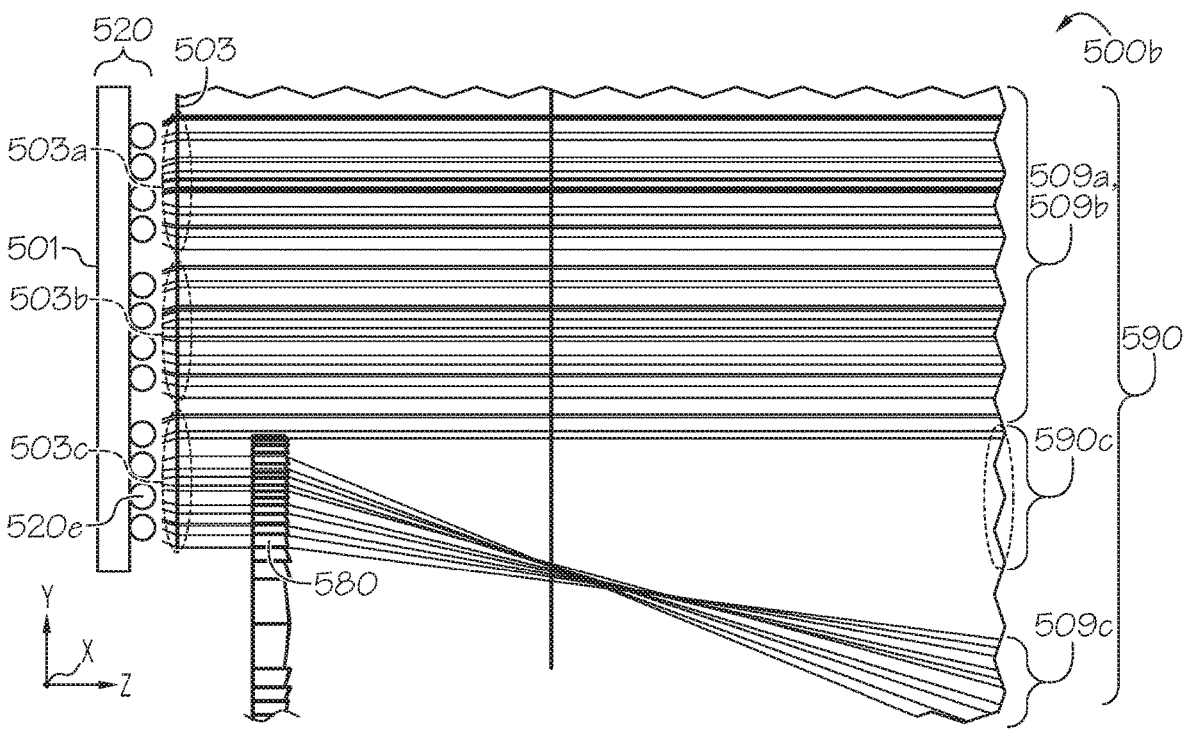
FIG. 5B illustrates an example of an optical element and an emitter array configured to provide non-uniform far field illumination patterns over a vertical field of view in accordance with some embodiments of the present disclosure.

FIG. 5A illustrates a comparative example of an optical element and an emitter array configured to provide a uniform far field illumination pattern over a vertical field of view, while FIG. 5B illustrates an example of an optical element and an emitter array configured to provide a non-uniform far field illumination pattern over a vertical field of view in accordance with some embodiments of the present disclosure.

In FIGS. 5A and 5B, an emitter array 520 includes a plurality of emitter elements 520e on a substrate 501. In some embodiments, the emitters 520e may be diced from individual wafers or from different locations on a same wafer, and may be attached and electrically interconnected onto the common substrate 501. That is, the common substrate 501 on which the emitters 520e are assembled may be a non-native substrate, which is different than the respective substrates on which the emitters 520e were formed. In some embodiments, the emitters 520e may be printed on common substrate 501 using Micro Transfer Printing (MTP) techniques. As such, one or more of the emitters 520e may include residual tether portions that previously anchored the emitters 520e to a source substrate or wafer prior to the MTP process. Fabrication of emitter arrays using such MTP techniques is described in U.S. Patent Application Publication No. 2018/0301872 to Burroughs et al., the disclosure of which is incorporated by reference herein in its entirety. In some embodiments, subsets of the emitters 520e may be first attached to a substrate such as a printed circuit board, and then placed on the common substrate 501 with a desired spatial arrangement (e.g., in rows and columns to define the array 520) and electrically connected to driver/control circuitry and a power supply.

In some embodiments, the emitter array 520 may include an array of light emitting diodes as the emitters 520e. In some embodiments, the emitter array 520 may include an array of vertical cavity surface emitting lasers (VCSELs) as the emitters 520e. In some embodiments, the emitter array 520 may include an array an array of side- or edge-emitting laser diodes as the emitters 520e. Other emitter arrays and/or emission sources described herein (e.g., 120, 320, 720, 1120) may include similar configurations.

As shown in FIGS. 5A and 5B, the emitters 520e are arranged to output optical signals 509 through respective sub-regions 503a, 503b, 503c of an aperture 503 to illuminate respective portions (e.g., field angles) 590a, 590b, 590c of a field of view 590. That is, absent the illumination optics (e.g., 80, 580), the far field angles 590a, 590b, 590c illuminated by the emitters 520e may have a 1:1 mapping to respective locations or sub-regions 503a, 503b, 503c of the aperture. 503.

In FIG. 5A, an optical element 80 is arranged to divert the optical signals from all of the respective sub-regions 503a, 503b, 503c of the aperture 503, to thereby expand the far field illumination pattern defined by the optical signals over the field of view 590 in a substantially uniform manner. However, the use of a single optical element 80 over the aperture 503 may introduce some drawbacks. For example, the optical element 80 may introduce unnecessary optical losses for optical signals output from emitters 520e that are otherwise positioned to illuminate respective portions 590a, 590b, 590c of the field of view. Also, where the optical element 80 includes multiple microlenses or lenslets, differences in the coefficient of expansion of the optical element 80 and the emitter array 520 may result in misalignment of the elements 520e, 80 (and thus misshaping of the desired illumination pattern) with variations in the operating temperature.

As shown in the example of FIG. 5B, providing an optical element 580 (e.g., a lens, diffuser, or other optical element) that is aligned with or otherwise positioned in an optical path defined by a particular sub-region 503c of the optical aperture 503 can divert one or more subsets 509c of the optical signals 509 away from the portion 590c of the field of view 590, without substantially altering one or more other subsets 509a, 509b of the optical signals 509. In particular, the subsets 509a and 509b of the optical signals 509 are output through respective sub-regions 503a and 503b of the optical aperture 503 with respective directions of propagation and/or beam divergence unaltered, while the direction of propagation of the subset 509c of the optical signals 509 is diverted to a portion or field angle of the field of view 590 that is different than the portion 590c to which the emitters 520e are arranged to illuminate. The configuration and/or arrangement of the optical element 580 relative to the aperture 503 thereby provides selective or continuous variation of the relative 'weight' of the far field illumination pattern provided by light output 509a, 509b, 509c from each portion or sub-region 503a, 503b, 503c of the optical aperture 503. That is, dividing optical aperture 503 into sub regions 503a, 503b, 503c allows for different far field patterns with the same optical element 580 (shown as a Fresnel lens by way of example). In some embodiments, one or more 503a, 503b, 503c of the optical aperture 503 may include respective optical elements in the optical path(s) defined thereby, while one or more other sub-regions 503a, 503b, 503c of the optical aperture 503 may be free of respective optical elements in their optical path(s). Some embodiments may further include one or more mechanisms that are configured to mechanically translate the optical element 580 relative to the optical aperture 503, so as to vary the coverage of the optical aperture 503 by the optical element 580 and thus continuously vary the far field pattern over the field of view 590, for example, in real-time under control of a control circuit as described herein.

Optical elements described herein may also be configured to provide increased granularity for subdivision of the optical aperture. For example, to generate a particular far field pattern, the optical aperture may be divided or allocated into sections or sub-regions, with each section or sub-region identified as being configured to output a portion of a desired far field illumination pattern.

FIGS. 6A, 6B, and 6C illustrate various examples of optical elements 680a, 680b, and 680c that are configured to provide varying or non-uniform illumination by aligning respective regions thereof having different optical characteristics with multiple sub-regions of a large emission optical aperture in accordance with some embodiments of the present disclosure. In particular, FIG. 6A illustrates an optical element 680a having first and second regions 681a and 682a with different optical characteristics (e.g., different refractive or diffractive characteristics), which is configured to be aligned with respective first and second sub-regions of an optical aperture to provide distinct far field illumination patterns from each. In FIG. 6B, a large emission optical aperture is divided or allocated into eight sub-regions (with each sub-region being identified as defining a respective optical path of a distinct far field illumination pattern), and optical element 680b includes eight regions 681b to 688b having different optical characteristics that are configured to be aligned with or arranged in respective optical paths defined by the eight sub-regions of the optical aperture. In FIG. 6C, an optical element 680c is implemented as a microlens array including different microlenses 681c to 689c having shapes that vary across a surface of the optical element 680c to provide continuously varying optical characteristics.

That is, optical elements 680a, 680b, 680c may be arranged and configured such that one or more sub-regions of the aperture can be aligned with their own micro-optic structure or diffractive grating prescription, etc., so as to provide stepwise (i.e., discrete) or continuous variation in optical characteristics across one or more dimensions of an optical aperture. The optical elements 680a, 680b, and 680c may thus allow respective sub-regions of the aperture to provide respective far field illumination patterns over respective regions/angles of the field of view, to collectively define a desired far field illumination pattern over the field of view. In particular, the optical elements 680a, 680b, 680c may be used to define a non-uniform intensity distribution that is a linear combination of respective far field illumination patterns defined by the optical signals output through the respective sub-regions of the optical aperture.

Figure 7:
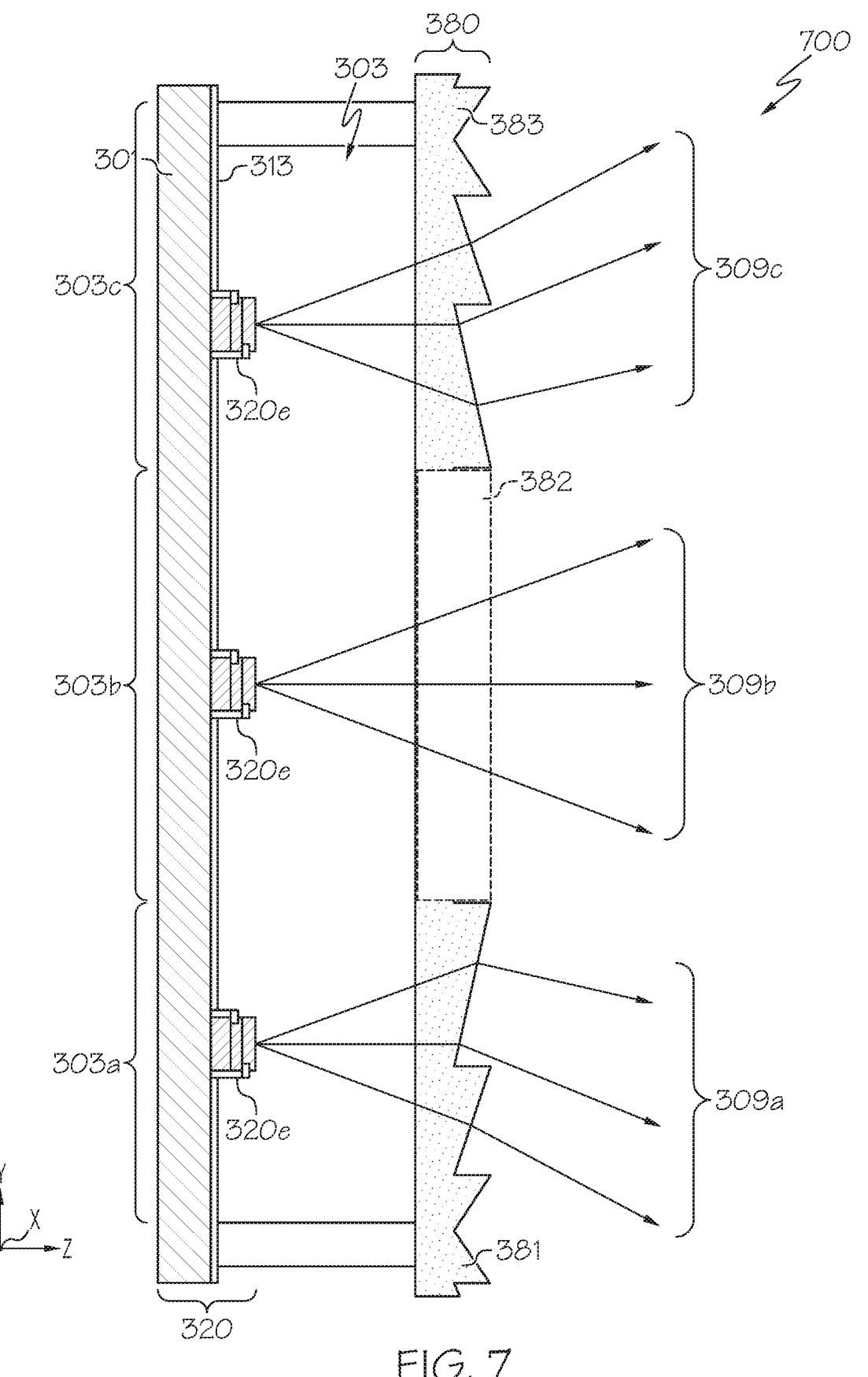
FIGS. 7 and 8 are side views illustrating example configurations of an emitter array including integrated optical elements configured to provide non-uniform far field illumination patterns over a vertical field of view in accordance with some embodiments of the present disclosure.

In some embodiments, each section or sub-region of an optical aperture may be aligned with its own diffuser or other beam steering optics. For example, FIG. 7 illustrates an emission source 700 including an emitter array 320 including a plurality of VCSELs 320e assembled on a substrate 301. The VCSELs 320e are arranged to emit optical signals 309a, 309b, 309c through respective sub-regions 303a, 303b, 303c of an aperture 303 including an integrated optical element 380 in accordance with embodiments described herein. In particular, optical element 380 is implemented as a large-area partial Fresnel lens array 380 overlying the entire aperture 303, with respective regions 381, 382, 383 having different optical characteristics. As such, each VCSEL 320e is positioned at a different region 303a, 303b, 303c of the optical aperture 303 and is aligned with respective regions 381, 382, 383 of a Fresnel lens array 380. One or more regions 382 of the lens array 380 may be free of optical power or otherwise configured so as not to alter the optical signals 309b passing therethrough. As such, the large-area Fresnel lens array 380 may be designed or otherwise configured to provide respective divergences of the optical signals 309a and 309c to achieve a desired far field pattern. The lens array 380 may be flexible (e.g., plastic) in some embodiments so as to be bendable or otherwise conform to the curvature of the emitter array 320. The lens array 308 is not limited to a Fresnel lens array, but may be implemented by a flexible diffusing film in some embodiments.

Figure 8:
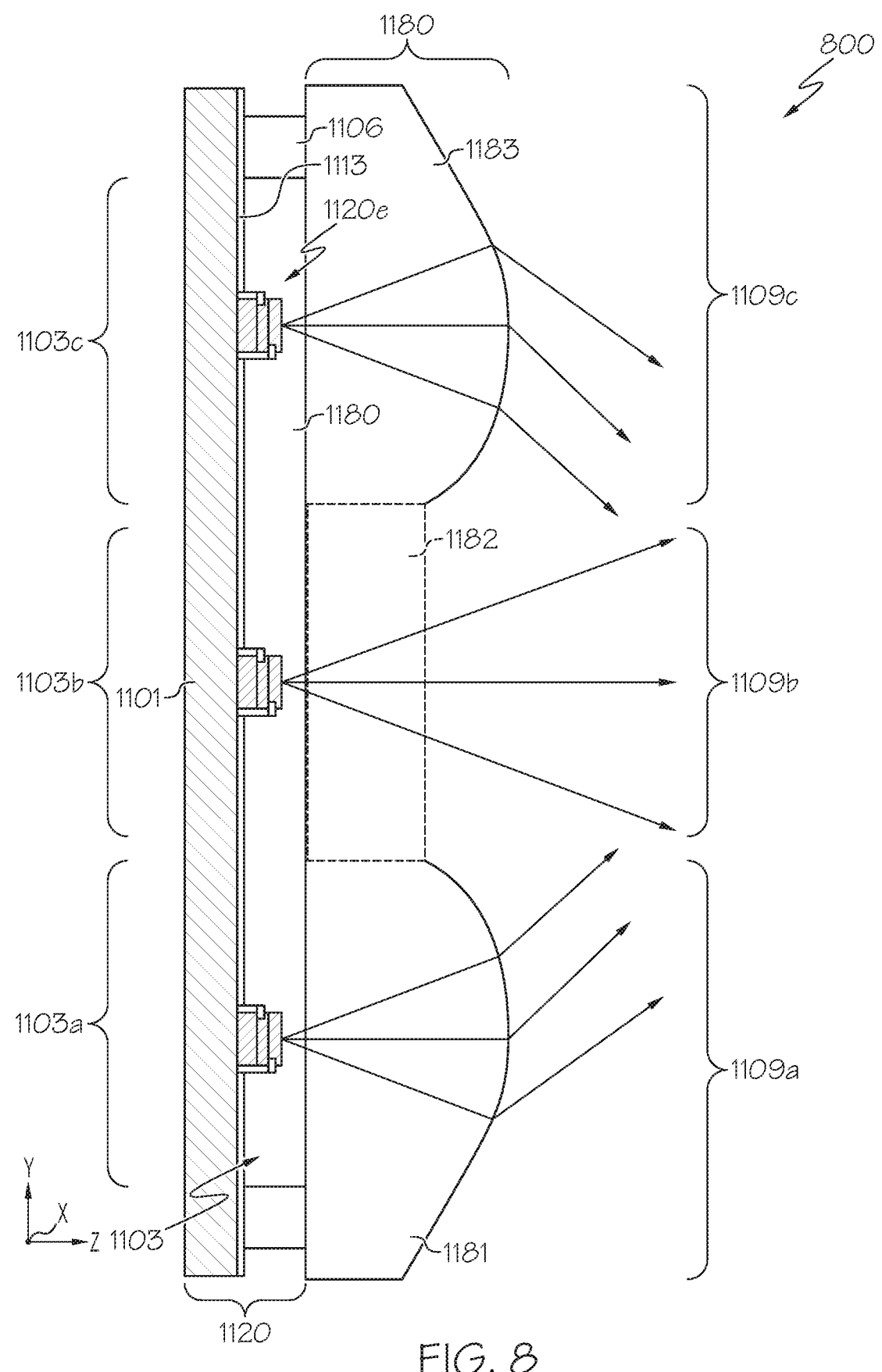

FIG. 8 illustrates an emission source 800 configuration in accordance with further embodiments described herein. The emission source 800 includes an emitter array 1120 including a plurality of VCSELs 1120e that are arranged on a substrate 1101 to emit optical signals 1109a, 1109b, 1109c through respective sub-regions 1103a, 1103b, 1103c of an aperture 1103 including an integrated optical element 1180. In FIG. 8, the optical element 1180 is implemented as a micro-lens array in which the individual lenslets 1181, 1182, 1183 aligned with or positioned over respective sub-regions 1103a, 1103b, 1103c of the optical aperture 110 have different shapes that vary independently of one another so as to provide different optical characteristics across the respective sub-regions of the aperture 1103. One or more lenslets 1182 of the micro-lens array 1180 may be free of optical power or otherwise configured so as not to alter the optical signals 1109b passing therethrough.

For example, with reference to an X-Y plane defined by the surface of the substrate 1101, the shape of the lenslets 1181, 1183 at ends of the array 1180 may be configured to differ from the lenslet 1182 therebetween in the Y-direction, to provide output light 1109a, 1109b, 1109c with non-uniform far field illumination patterns along the Y-direction (which may correspond to a desired vertical divergence). In particular, the lenslets 1181 and 1183 may be configured to divert the optical signals 1109a and 1109c away from the respective portions of the field of view corresponding to the sub-regions 1103a and 1103c of the aperture, while the lenslet 1182 may not substantially alter the optical signals 1109b. More generally, the lens prescription can vary from lenslet to lenslet 1181, 1182, 1183 of the micro-lens array 1180 to provide respective divergences of the optical signals 1109a, 1109b, and/or 1109c to achieve a desired far field illumination pattern. The micro-lens array 1180 may likewise be flexible (e.g., plastic) in some embodiments so as to be bendable or otherwise conform to the curvature of the emitter array 1120.

While described above primarily with reference to optical elements and emitter arrays oriented to provide far field illumination patterns having a desired vertical divergence, it will be understood that these orientations may be similarly varied to provide a desired horizontal divergence. For example, in FIG. 8, the shapes of the lenslets 1181, 1182, 1183 may additionally or alternatively be varied in the X-direction, in order to likewise provide the output light 1109a, 1109b, 1109c with non-uniform far field illumination patterns along the X-direction (which may correspond to a desired horizontal divergence).

FIGS. 9A-9D illustrate further examples of LIDAR devices including optical elements configured to provide illumination having a non-uniform intensity distribution over a horizontal field of view in accordance with some embodiments of the present disclosure. As shown in the partial exploded view of FIG. 9A, the LIDAR device 900 may be similar to the device 300$c$ of FIG. 3C, but includes one or more optical elements 980 that can be positioned (e.g., to at least partially cover the optical aperture 703) or can be otherwise configured (e.g., with different optical structures in different regions of the optical element 980) with respect to the light emission path defined by the optical aperture 703 so as to divert different subsets of the optical signals emitted from the emitters of the array 720 into a different far field patterns over the horizontal field of view.

Figure 9A:
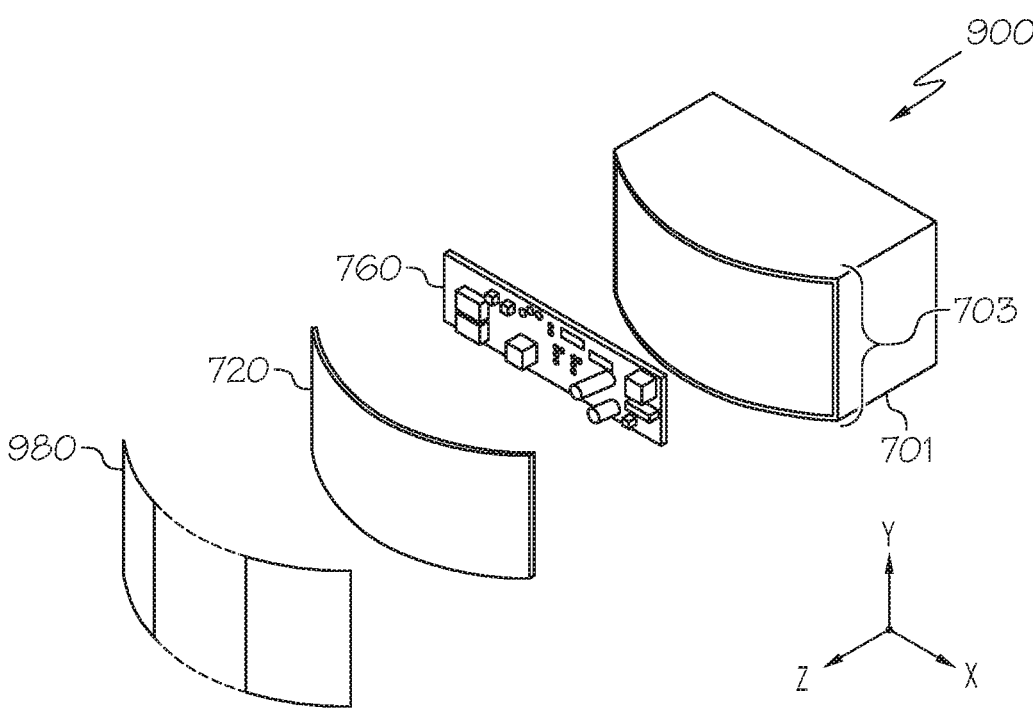
FIG. 9A is an exploded view illustrating components of LIDAR devices including optical elements configured to provide illumination having a non-uniform intensity distribution over a horizontal field of view in accordance with some embodiments of the present disclosure.
Figure 9B:
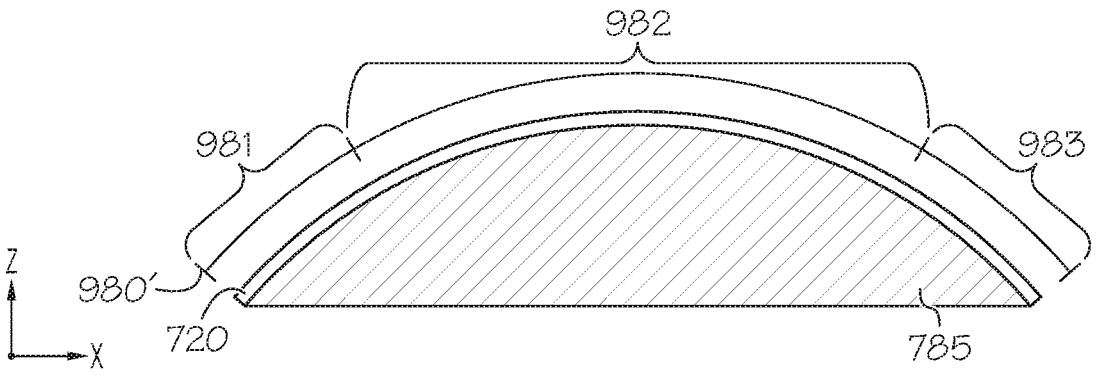
FIG. 9B is an enlarged top view illustrating an example of the optical element and emitter array of FIG. 9A.

FIG. 9B is an enlarged top view illustrating the emitter array 720 and an example 980' of the optical element 980 of FIG. 9A in greater detail. As shown in FIG. 9B, the emitter array 720 may be a distributed emitter array including a plurality of emitters positioned or arranged in rows and columns on a curved, non-native substrate of a flexible material that can be bent around a mandrel element 785 to provide curved emitting surface, as described in greater detail above with reference to FIGS. 3D and 3E. The optical element 980' includes multiple regions 981, 982, 983 having different optical characteristics and/or features. For example, the optical element 980 may be a lens array or diffuser having regions 981, 982, 983 with different refractive or diffractive properties.

Still referring to FIG. 9B, the region 981 of the optical element 980' is aligned with a peripheral (left) sub-region of the optical aperture 703 so as to cover or otherwise be positioned in the optical paths of the optical signals emitted by one or more emitters that are arranged in columns to the left of a central region of the emitter array 720. The region 982 is aligned with a second (center) sub-region of the optical aperture 703, so as to cover or otherwise be positioned in the optical paths of the optical signals emitted by one or more emitters arranged in central columns of the emitter array 720. The region 983 of the optical element 980' is aligned with a peripheral (right) sub-region of the optical aperture 703 so as to cover or otherwise be positioned in the optical paths of the optical signals emitted by one or more emitters that are arranged in columns to the right of a central region of the emitter array 720.

One or more of the regions 982 may be transparent or otherwise free of (refractive or diffractive) optical power. The regions 981, 983 of the optical element 980' may thereby selectively divert the optical signals output from the emitters in one or more peripheral columns of the emitter array 720 away from the respective portions of the field of view that they are arranged to illuminate, while one or more regions 982 of the optical element 980 may not substantially alter or affect the optical signals output from the emitters in one or more central columns of the emitter array 720, to thereby provide the non-uniform intensity distribution over the horizontal field of view.

Figure 9C:
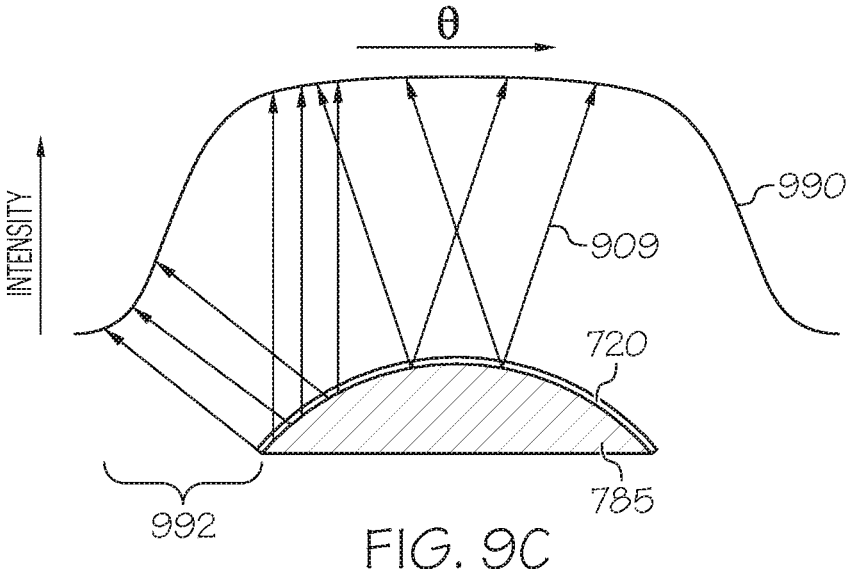
FIG. 9C is a graph illustrating a comparative example of a far field illumination pattern over a horizontal field of view in the absence of optical elements as described herein.
Figure 9D:
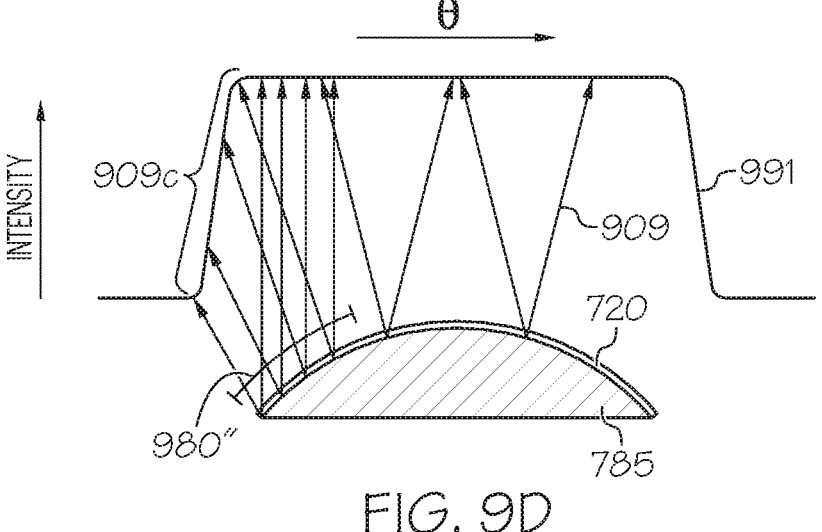
FIG. 9D is a graph illustrating an example of a non-uniform far field illumination pattern over a horizontal field of view provided by optical elements in accordance with some embodiments of the present disclosure.

FIG. 9C illustrates a comparative example of a far field illumination pattern over a horizontal field of view provided by an emitter array in the absence of optical elements as described herein, while FIG. 9D illustrates an example of a far field illumination pattern over a horizontal field of view provided by an emitter array in combination with optical elements in accordance with some embodiments of the present disclosure. As shown in FIG. 9C, the intensity distribution of the optical signals 909 over the field of view relies on the curvature of the emitter array 720 (and/or underlying mandrel element 785) to shape the far field illumination pattern 990. However, edges 992 of the far field pattern 990 may suffer from light that leaks outside of the desired field of view, for example, due to the divergence in the light output of the peripherally-arranged VCSELs and/or the curvature of the array 720.

In contrast, as shown in FIG. 9D, an optical element 980" is aligned with a peripheral sub-region of the optical aperture defining optical paths for signals emitted from peripheral columns of the emitter array 720, thereby selectively diverting the optical signals 909$c$ without substantially affecting the optical signals 909 from the central sub-region of the aperture or central columns of the emitter array 720, to alter the intensity distribution at the edge of the far field illumination pattern 991. In particular, the optical element 980" may be configured to selectively collimate the optical signals 909$c$ (e.g., so as to reduce divergence thereof to nearly 0 degrees) without substantially affecting divergence the optical signals 909. The optical element 980" may be one or more lenses, lens arrays, diffusers, or other optical elements as described herein. Also, while illustrated in FIG. 9D as being implemented by partial coverage of a periphery of the emitter array 720 and optical aperture, it will be understood that the optical element may include multiple regions with different optical characteristics that extend over a greater portion or up to the entirety of emitter array and/or aperture (e.g., as shown by the optical element 980' of FIG. 9B), while providing the desired far field illumination pattern 991.

It will be understood that embodiments described herein may be particularly advantageous for emission sources having large array optical apertures and substantial spacing (pitch) between adjacent emitters. In some embodiments described herein, large array optical apertures may refer to apertures having a longest dimension that exceeds about 5 mm to 10 mm, while substantial spacing may refer to inter-emitter spacings of greater than about twice the (micro) aperture of individual elements (e.g. spacings of about 200 microns or more between emitters for an array of emitters with or corresponding to 100 micron aperture sub-regions). For such emission sources, the larger spacing can provide design flexibility for the individual optical elements, which can be more easily aligned to the individual emitters as micro-sources of illumination over the area of the common optical aperture.

In addition, embodiments described herein may provide illumination patterns defined by coherent addition of intensity. For example, the laser diodes of the emitter array may be configured to output optical signals that are optically in phase, such that the far field illumination pattern may be defined by coherent addition of the electric fields for multiple (or even all) emitters. In some embodiments, optical elements as described herein may alter one or more portions of the illumination patterns to affect the coherent result. For example, optical elements as described herein may selectively divert subsets of the optical signals such that the coherent light emission from respective laser diodes is output in different directions, e.g., to provide local maxima or minima of intensity in specific directions.

In some embodiments, the far field illumination pattern may include incoherent output light. That is, while the respective light emissions from the individual laser diodes are coherent, the light output beam from the array includes an incoherent combination or superposition of the respective emissions, as the phase of the light emission from one of the laser diodes can be independent of that from another. Such embodiments are described in U.S. Patent Application Publication No. 2018/0301874 to Burroughs et. al, the disclosure of which is incorporated by reference herein.

Some benefits of embodiments described herein may include greater efficiency and design flexibility in the non-uniform distribution of light from a single optical aperture in the far field, for multiple applications. Applications in which customization or other control of far field patterns may be important may include lidar, automotive headlamps/tail lights, image projectors, indoor lighting, commercial outdoor and landscape illumination, etc.

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be vertical cavity surface emitting lasers (VCSELs). In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication No. 2018/0301872 to Burroughs et al.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

It will be understood that when an element is referred to or illustrated as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation, the scope of the present invention being set forth in the following claims.

That which is claimed:

1. A Light Detection and Ranging (LIDAR) apparatus, comprising:
    an optical aperture;
    an emitter array comprising emitter elements configured to output optical signals through the optical aperture to illuminate respective portions of a field of view; and
    an optical element configured to divert a first subset of the optical signals away from at least one of the respective portions of the field of view configured to be illuminated thereby, without substantially altering a second subset of the optical signals,
    wherein the optical aperture comprises first and second sub-regions that define optical paths of the first and second subsets of the optical signals, respectively, wherein at least a portion of the optical element is aligned with the first sub-region of the optical aperture.

2. The LIDAR apparatus of claim 1, wherein the optical element is configured to divert the first subset of the optical signals such that illumination of the respective portions of the field of view comprises a non-uniform intensity distribution.

3. The LIDAR apparatus of claim 2, wherein the non-uniform intensity distribution comprises a linear combination of respective far field illumination patterns corresponding to the first and second sub-regions of the optical aperture, optionally wherein the non-uniform intensity distribution comprises coherent addition of the respective far field illumination patterns.

4. The LIDAR apparatus of claim 1, wherein the optical element is configured to divert the first subset of the optical signals such that illumination of the respective portions of the field of view comprises a non-uniform intensity distribution.

5. The LIDAR apparatus of claim 1, wherein first and second subsets of the emitter elements that are configured to emit the first and second subsets of the optical signals are arranged in different rows of the emitter array, respectively.

6. The LIDAR apparatus of claim 1, wherein first and second subsets of the emitter elements that are configured to emit the first and second subsets of the optical signals are arranged in different columns of the emitter array, respectively.

7. The LIDAR apparatus of claim 1, wherein the second sub-region of the optical aperture is free of the optical element.

8. The LIDAR apparatus of claim 1, wherein the optical element comprises first and second regions having different optical characteristics that are aligned with the first and second sub-regions of the optical aperture, respectively.

9. The LIDAR apparatus of claim 8, wherein the second region of the optical element is free of optical power.

10. The LIDAR apparatus of claim 8, wherein the different optical characteristics vary in a stepwise or continuous fashion between the first and second regions of the optical element.

11. The LIDAR apparatus of claim 1, wherein the optical element comprises a patterned diffuser comprising first and second regions having different optical characteristics that are aligned with the first and second sub-regions of the optical aperture, respectively.

12. The LIDAR apparatus of claim 1, wherein the optical element comprises a lens array comprising first and second lens elements having different optical characteristics that are aligned with the first and second sub-regions of the optical aperture, respectively.

13. A Light Detection and Ranging (LIDAR) apparatus, comprising:
    an optical aperture;
    an emitter array comprising emitter elements configured to output optical signals through the optical aperture to illuminate respective portions of a field of view; and
    an optical element configured to divert a first subset of the optical signals away from at least one of the respective portions of the field of view configured to be illuminated thereby, without substantially altering a second subset of the optical signals,
    wherein the optical element is configured to collimate the first subset of optical signals without substantially affecting divergence of the second subset of the optical signals.

14. A Light Detection and Ranging (LIDAR) imaging element, comprising:
    an optical element that is configured to be arranged on an optical aperture of an emission source, the optical aperture comprising respective sub-regions that correspond to respective portions of a field of view,
    wherein the optical element comprises optical characteristics that vary over the respective sub-regions of the optical aperture and is configured to divert a first subset of optical signals from the emission source away from at least one of the respective portions of the field of view without substantially altering a second subset of the optical signals.

15. A method of fabricating a Light Detection and Ranging (LIDAR) apparatus, the method comprising:
    providing an emitter array comprising emitter elements that are configured to output optical signals through an optical aperture to illuminate respective portions of a field of view; and
    providing an optical element that is configured to divert a first subset of the optical signals away from at least one of the respective portions of the field of view configured to be illuminated thereby, without substantially altering a second subset of the optical signals,
    wherein providing the optical element comprises:
        identifying first and second sub-regions of the optical aperture as defining optical paths of the first and second subsets of the optical signals, respectively; and arranging at least a portion of the optical element to be aligned with the first sub-region of the optical aperture.

16. The method of claim 15, wherein the optical element is configured to divert the first subset of the optical signals such that illumination of the respective portions of the field of view comprises a non-uniform intensity distribution.

17. The method of claim 16, wherein the non-uniform intensity distribution comprises a linear combination of respective far field illumination patterns corresponding to the first and second sub-regions of the optical aperture, optionally wherein the non-uniform intensity distribution comprises coherent addition of the respective far field illumination patterns.

18. The method of claim 15, wherein first and second subsets of the emitter elements that are configured to emit the first and second subsets of the optical signals are arranged in different rows of the emitter array, respectively.

19. The method of claim 15, wherein first and second subsets of the emitter elements that are configured to emit the first and second subsets of the optical signals are arranged in different regions of the emitter array, respectively.

20. The method of claim 15, wherein first and second subsets of the emitter elements that are configured to emit the first and second subsets of the optical signals are arranged in different columns of the emitter array, respectively.

21. The method of claim 15, wherein the second sub-region of the optical aperture is free of the optical element.

22. The method of claim 15, wherein the optical element comprises first and second regions having different optical characteristics that are aligned with the first and second sub-regions of the optical aperture, respectively.

23. The method of claim 22, wherein the second region of the optical element is free of optical power.

24. The method of claim 22, wherein the different optical characteristics vary in a stepwise or continuous fashion between the first and second regions of the optical element.

25. The method of claim 15, wherein the optical element comprises a patterned diffuser comprising first and second regions having different optical characteristics that are aligned with the first and second sub-regions of the optical aperture, respectively.

26. The method of claim 15, wherein the optical element comprises a lens array comprising first and second lens elements having different optical characteristics that are aligned with the first and second sub-regions of the optical aperture, respectively.

27. A method of fabricating a Light Detection and Ranging (LIDAR) apparatus, the method comprising:

providing an emitter array comprising emitter elements that are configured to output optical signals through an optical aperture to illuminate respective portions of a field of view; and providing an optical element that is configured to divert a first subset of the optical signals away from at least one of the respective portions of the field of view configured to be illuminated thereby, without substantially altering a second subset of the optical signals, wherein the optical element is configured to collimate the first subset of optical signals without substantially affecting divergence of the second subset of the optical signals.

* * * * *